(12) United States Patent
Ikeda et al.

(10) Patent No.: US 10,628,758 B2
(45) Date of Patent: Apr. 21, 2020

(54) TRANSPORTATION SERVICE RESERVATION METHOD, TRANSPORTATION SERVICE RESERVATION APPARATUS, AND COMPUTER-READABLE STORAGE MEDIUM

(71) Applicants: FUJITSU LIMITED, Kawasaki-shi, Kanagawa (JP); Massachusetts Institute of Technology, Cambridge, MA (US)

(72) Inventors: Takuro Ikeda, Yokohama (JP); Moshe E. Ben-Akiva, Brookline, MA (US); Bilge Atasoy, Watertown, MA (US)

(73) Assignees: FUJITSU LIMITED, Kawasaki (JP); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 1019 days.

(21) Appl. No.: 14/857,233

(22) Filed: Sep. 17, 2015

(65) Prior Publication Data

US 2016/0117610 A1 Apr. 28, 2016

Related U.S. Application Data

(60) Provisional application No. 62/069,390, filed on Oct. 28, 2014.

(51) Int. Cl.
*G06Q 10/02* (2012.01)
*G06Q 50/32* (2012.01)

(52) U.S. Cl.
CPC ............. *G06Q 10/02* (2013.01); *G06Q 50/32* (2013.01)

(58) Field of Classification Search
CPC ................................ G06Q 10/02; G06Q 50/32
See application file for complete search history.

(56) References Cited

U.S. PATENT DOCUMENTS

| 6,697,730 B2 * | 2/2004 | Dickerson | G06Q 50/30 |
| | | | 701/465 |
| 8,744,882 B2 * | 6/2014 | Carey | G06Q 10/02 |
| | | | 705/5 |

(Continued)

FOREIGN PATENT DOCUMENTS

| JP | 2001-229495 | 8/2001 |
| JP | 2002-342873 | 11/2002 |

(Continued)

OTHER PUBLICATIONS

Petros Lalos, "A Framework for dynamic car and taxi pools with the use of Positioning Systems", 2009, 2009 Computation World: Future Computing, SErvice Computation, Cognitive, Adaptive, Content, Patterns, all pages (Year: 2009).*

(Continued)

*Primary Examiner* — Kevin H Flynn
*Assistant Examiner* — Omar Zeroual
(74) *Attorney, Agent, or Firm* — Staas & Halsey LLP

(57) ABSTRACT

A transportation service reservation method executes, by a computer, a process including receiving a ride request specifying an origin and a destination, generating feasible products having service types, by referring to a storage unit that stores information indicating a schedule allocated to each vehicle and the service types of the schedule, for each vehicle capable of providing products having the service types, computing a choice probability of each product forming an assortment of the feasible products, for each of assortments satisfying a predetermined condition amongst the subsets of the feasible product set that are generated, computing an expected value of a number of future ride (Continued)

requests, and selecting an assortment to be presented with respect to the ride request, from the assortment satisfying the predetermined condition, based on the choice probability and the expected value.

21 Claims, 18 Drawing Sheets

(56) References Cited

U.S. PATENT DOCUMENTS

| | | | |
|---|---|---|---|
| 9,706,367 B2* | 7/2017 | Tao | G01C 21/3438 |
| 2002/0019760 A1* | 2/2002 | Murakami | G06Q 10/047 |
| | | | 705/7.25 |
| 2003/0040944 A1* | 2/2003 | Hileman | G06Q 10/02 |
| | | | 705/5 |
| 2005/0143095 A1* | 6/2005 | Jacob | G06Q 20/32 |
| | | | 455/456.3 |
| 2008/0189148 A1* | 8/2008 | Diaz | G06Q 10/02 |
| | | | 705/6 |
| 2009/0037095 A1* | 2/2009 | Jani | G06Q 10/08 |
| | | | 701/533 |
| 2009/0248587 A1* | 10/2009 | Van Buskirk | G06Q 50/30 |
| | | | 705/80 |
| 2010/0153192 A1* | 6/2010 | Hamilton, II | G06Q 10/02 |
| | | | 705/13 |
| 2010/0185486 A1* | 7/2010 | Barker | G06Q 30/0202 |
| | | | 705/7.31 |
| 2011/0246404 A1* | 10/2011 | Lehmann | G06Q 10/02 |
| | | | 706/21 |
| 2011/0301835 A1* | 12/2011 | Bongiorno | G01C 21/343 |
| | | | 705/6 |
| 2013/0073327 A1* | 3/2013 | Edelberg | G06Q 10/047 |
| | | | 705/7.13 |
| 2013/0144831 A1* | 6/2013 | Atlas | G06N 5/02 |
| | | | 706/50 |
| 2013/0204923 A1* | 8/2013 | Gibson | G06Q 30/02 |
| | | | 709/203 |
| 2014/0005934 A1* | 1/2014 | Chia | G01C 21/00 |
| | | | 701/450 |
| 2014/0053105 A1* | 2/2014 | Sakata | H04N 21/44218 |
| | | | 715/811 |
| 2014/0058882 A1* | 2/2014 | Roberts | G06Q 30/0631 |
| | | | 705/26.7 |
| 2014/0089036 A1* | 3/2014 | Chidlovskii | G06Q 10/06 |
| | | | 705/7.27 |
| 2014/0129951 A1* | 5/2014 | Amin | G06Q 50/30 |
| | | | 715/738 |
| 2014/0173511 A1* | 6/2014 | Lehmann | G06Q 10/02 |
| | | | 715/810 |
| 2014/0229099 A1* | 8/2014 | Garrett | G06Q 10/06311 |
| | | | 701/465 |
| 2014/0229258 A1* | 8/2014 | Seriani | G06Q 30/08 |
| | | | 705/14.23 |
| 2014/0365250 A1* | 12/2014 | Ikeda | G06Q 50/30 |
| | | | 705/5 |
| 2015/0176997 A1* | 6/2015 | Pursche | G08G 1/0967 |
| | | | 340/905 |
| 2015/0248689 A1* | 9/2015 | Paul | G06Q 30/0222 |
| | | | 705/14.23 |
| 2015/0339704 A1* | 11/2015 | Liu | G06O 30/0247 |
| | | | 705/14.46 |
| 2015/0369621 A1* | 12/2015 | Abhyanker | G01C 21/3438 |
| | | | 701/461 |
| 2016/0042303 A1* | 2/2016 | Medina | G01C 21/3438 |
| | | | 705/5 |
| 2016/0078516 A1* | 3/2016 | Alnuwaysir | G06Q 30/0641 |
| | | | 705/26.62 |
| 2016/0116296 A1* | 4/2016 | Nguyen | G01C 21/3423 |
| | | | 701/533 |
| 2016/0155072 A1* | 6/2016 | Prodromidis | G06Q 50/32 |
| | | | 705/13 |
| 2016/0209220 A1* | 7/2016 | Laetz | G08G 1/202 |
| 2017/0193405 A1* | 7/2017 | Lambert | G06Q 10/02 |
| 2017/0347236 A1* | 11/2017 | Frusina | H04M 1/72572 |

FOREIGN PATENT DOCUMENTS

| | | |
|---|---|---|
| JP | 2003-6784 | 1/2003 |
| JP | 2006-172145 | 6/2006 |
| JP | 2014-238831 | 12/2014 |

OTHER PUBLICATIONS

Donald Anderson, ""Not just a taxi"? for profit ridesharing, driver strategies, and VMT", May 28, 2014, Springer Science, all pages. (Year: 2014).*

Chichung Tao, "Behavioral Responses to Dynamic Ridesharing Services", 2008, IEEE, all pages (Year: 2008).*

Mark Horn, "Fleet scheduling and dispatching for demand responsive passenger services", 2002, Transportation Research, all pages (Year: 2002).*

Masabumu Furuhata, "Ridesharing: The state-of-the-art and future directions", Aug. 22, 2013, Elsevier, Transportation Research Part B, all pages (Year: 2013).*

Baoxiang Li, "The Share-a-Ride Problem: People and parcels sharing taxis", Mar. 13, 2014, Elsevier, European Journal of Operational Research, all pages (Year: 2014).*

Niels Agatz, "Optimization for dynamic ride-sharing: A review", published by European Journal of Operational Research, on May 29, 2012 (Year: 2012).*

Andrew Amey, "Real-Time Ridesharing: Opportunities and Challenges in Using Mobile Phone Technology to Improve Rideshare Services", published by Transportation research Record: Journal of the Transportation Research Board, in 2011 (Year: 2011).*

Espacenet Bibliographic data, Publication No. 2014-238831, published Dec. 18, 2014.

Hailo. <https://hailoapp.com>. Retrieved on Jun. 23, 2015, 8 pp.
Uber. <https://www.uber.com>. Retrieved on Jun. 23, 2015, 8 pp.
Lyft. <https://www.lyft.com>. Retrieved on Jun. 23, 2015, 6 pp.
Sidecar. <https://www.side.cr>. Retrieved on Jun. 23, 2015, 6 pp.
Japanese Office Action dated Jun. 4, 2019 in corresponding Japanese Patent Application No. 2015-202232 (2 pages).

* cited by examiner

FIG.5

| SCHEDULE ID | $S_1$ | | | | $S_2$ | | $S_3$ | | | |
|---|---|---|---|---|---|---|---|---|---|---|
| SERVICE TYPE | SHARED-TAXI | | | | EMPTY | | MINI-BUS | | | |
| STOPPING LOCATION | a | b | c | d | d | g | g | h | i | j |
| ARRIVAL TIME | - | 9:15 | 9:30 | 9:50 | - | 14:40 | - | 15:00 | 15:10 | 15:20 |
| DEPARTURE TIME | 9:00 | 9:20 | 9:35 | - | 12:30 | - | 14:50 | 15:01 | 15:11 | - |
| BOARDING PASSENGER LIST | 1 | 2 | 1 | - | - | - | 4,5 | 6,7 | - | - |
| ALIGHTING PASSENGER LIST | - | - | - | 2 | - | - | - | 4 | 6 | 5,7 |

FIG.8

| USER ID | SCHEDULE ID | PICK-UP LOCATION | DROP-OFF LOCATION | BOARDING DATE | SCHEDULED PICK-UP TIME | SCHEDULED DROP-OFF TIME | FARE ($) |
|---|---|---|---|---|---|---|---|
| 1 | $S_1$ | a | c | 2013/11/13 | 9:00 | 9:30 | 10 |
| 2 | $S_1$ | b | d | 2013/11/13 | 9:20 | 9:50 | 15 |
| 3 | $S_1$ | e | f | 2013/11/13 | 9:45 | 10:20 | 20 |
| ... | ... | ... | ... | ... | ... | ... | ... |

| SCHEDULE ID | $S_1$ | | | | $S_5$ | | $S_4$ | | $S_6$ | | $S_3$ | | | |
|---|---|---|---|---|---|---|---|---|---|---|---|---|---|---|
| SERVICE TYPE | SHARED-TAXI | | | | EMPTY | | TAXI | | EMPTY | | MINI-BUS | | | |
| STOPPING LOCATION | a | b | c | d | d | e | e | f | f | g | g | h | i | j |
| ARRIVAL TIME | – | 9:15 | 9:30 | 9:50 | – | 13:00 | – | 13:30 | – | 14:40 | – | 15:00 | 15:10 | 15:20 |
| DEPARTURE TIME | 9:00 | 9:20 | 9:35 | – | 12:30 | – | 13:05 | – | 14:30 | – | 14:50 | 15:01 | 15:11 | – |
| BOARDING PASSENGER LIST | 1 | 2 | – | – | – | – | 3 | – | – | – | 4,5 | 6,7 | – | – |
| ALIGHTING PASSENGER LIST | – | – | 1 | 2 | – | – | – | 3 | – | – | – | 4 | 6 | 5,7 |

FIG.12

| SCHEDULE ID | $S_1$ | | | | | | $S_7$ | | $S_3$ | | | |
|---|---|---|---|---|---|---|---|---|---|---|---|---|
| SERVICE TYPE | SHARED-TAXI | | | | | | EMPTY | | MINI-BUS | | | |
| STOPPING LOCATION | a | b | c | e | d | f | d | g | g | h | i | j |
| ARRIVAL TIME | — | 9:15 | 9:30 | 9:40 | 9:55 | 10:20 | — | 14:40 | — | 15:00 | 15:10 | 15:20 |
| DEPARTURE TIME | 9:00 | 9:20 | 9:35 | 9:45 | — | — | 12:30 | — | 14:50 | 15:01 | 15:11 | — |
| BOARDING PASSENGER LIST | 1 | 2 | — | 3 | — | — | — | — | 4,5 | 6,7 | — | — |
| ALIGHTING PASSENGER LIST | — | — | 1 | — | 2 | 3 | — | — | — | 4 | 6 | 5,7 |

TRANSPORTATION SERVICE RESERVATION METHOD, TRANSPORTATION SERVICE RESERVATION APPARATUS, AND COMPUTER-READABLE STORAGE MEDIUM

CROSS-REFERENCE TO RELATED APPLICATIONS

This application is based upon and claims the benefit of priority of prior U.S. Provisional Patent Application No. 62/069,390, filed on Oct. 28, 2014, the entire contents of which are incorporated herein by reference.

FIELD

The embodiments discussed herein are related to a transportation service reservation method, a transportation service reservation apparatus, and a computer-readable storage medium.

BACKGROUND

Conventionally, systems have been proposed to reserve a taxi using a mobile device (refer to "URL:https://hailoapp.com/" retrieved on-line on Jun. 23, 2015, and "URL:https://www.uber.com/" retrieved on-line on Jun. 23, 2015, for example). The mobile device having a built-in GPS (Global Positioning System) sends a ride request that includes current position information to a server, according to an input from a user. The server allocates the ride request to a vehicle that can most quickly pick up the user, and notifies a scheduled pick-up time to the mobile device. The reservation is validated when the user sends an acceptance notification from the mobile device to the server.

On the other hand, systems have been proposed to match ride requests that can share a ride at relatively low fares (refer to "URL:http://www.lyft.com/" retrieved on-line on Jun. 23, 2015, and "URL:http://www.side.cr/" retrieved on-line on Jun. 23, 2015, for example). The user sends to the server a ride-sharing request in which conditions such as a pick-up location, a drop-off location, preferred departure time window or a preferred arrival time window, or the like are specified. The server retrieves ride-sharing providers or other ride-sharing candidates having other ride requests that are similar time-wise and space-wise to the ride-sharing request, and presents the retrieved results containing candidates of the ride-sharing. The reservation is validated when the user sends the acceptance notification from the mobile device to the server. The ride-sharing includes a type that provides a door-to-door transportation means, and a type that boards and alights passengers at predetermined locations such as bus stops or the like.

A taxi service can only cope with a single ride request, and cannot cope with the demands in a time period in which the demands are at a peak, nor cope with a rapid increase in the demands due to sudden rain or the like. For this reason, the user must wait for a long time to board the taxi when the demands for the taxi are high, to thereby greatly deteriorate user satisfaction of the taxi service. Some users may discontinue using the taxi service as the user satisfaction of the taxi service deteriorates, which in turn results in missed opportunities for a taxi service provider to make profit.

On the other hand, the probability of validating the matching in a ride-sharing service becomes low as the demands for the ride-sharing decrease. Further, when the matching is forcibly validated in the case in which the demands for the ride-sharing are low, the profit of a provider of the ride-sharing service decreases.

On the other hand, Japanese Laid-Open Patent Publication No. 2014-238831, for example, proposes a system to improve the profit of the service provider or the user satisfaction of the service. This proposed system dynamically allocates the same vehicle to a plurality of operation types such as the taxi, shared ride, or the like, according to the demands, so as to improve the profit of the service provider or the user satisfaction of the service.

However, the system proposed in Japanese Laid-Open Patent Publication No. 2014-238831, for example, does not take future demands into consideration, and only aims to improve the profit from the current user who is making the ride request. For this reason, depending on the reservation of the current user, a shortage of the vehicles may occur in the future, and there is a possibility of missing opportunities to provide services to other users. As a result, a sum total of the profit of the service provider or the user satisfaction of the service deteriorates. For example, providing the taxi service to the current user may result in no more vehicles that can be allocated, and in this case, other users wishing to use the ride-sharing service in the future will be enable to receive this ride-sharing service.

SUMMARY

Accordingly, it is an object in one aspect of the embodiments to provide a transportation service reservation method, a transportation service reservation apparatus, and a computer-readable storage medium, which can provide options to improve the sum total of the profit of the service provider or the user satisfaction of the service, by taking future demands into consideration.

According to one aspect of the embodiments, a transportation service reservation method includes receiving, by a computer, a ride request specifying an origin and a destination; generating, by the computer, feasible products having a plurality of service types, by referring to a storage unit that stores information indicating a schedule allocated to each vehicle and the service types of the schedule, for each vehicle capable of providing products having the plurality of service types using a single vehicle, wherein the products are defined as information indicating service contents of various transportation services that are provided; first computing, by the computer, a choice probability of each product forming an assortment of the feasible products, for each of assortments satisfying a predetermined condition amongst the subsets of the feasible product set that are generated; second computing, by the computer, an expected value of a number of ride requests which will be received in future; and selecting, by the computer, an assortment to be presented with respect to the ride request, from the assortments satisfying the predetermined condition, based on the choice probability and the expected value of the number of ride requests.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of schedule information stored in a schedule information storage unit;

FIG. 8 is a diagram illustrating an example of a configuration of the reservation information storage unit;

FIG. 11 is a diagram illustrating an example of a first updating of the schedule information;

FIG. 12 is a diagram illustrating an example of a second updating of the schedule information;

DESCRIPTION OF EMBODIMENTS

Preferred embodiments of the present invention will be described with reference to the accompanying drawings.

A description will now be given of the transportation service reservation method, the transportation service reservation apparatus, and the computer-readable storage medium in each embodiment according to the present invention.

Figure 1:
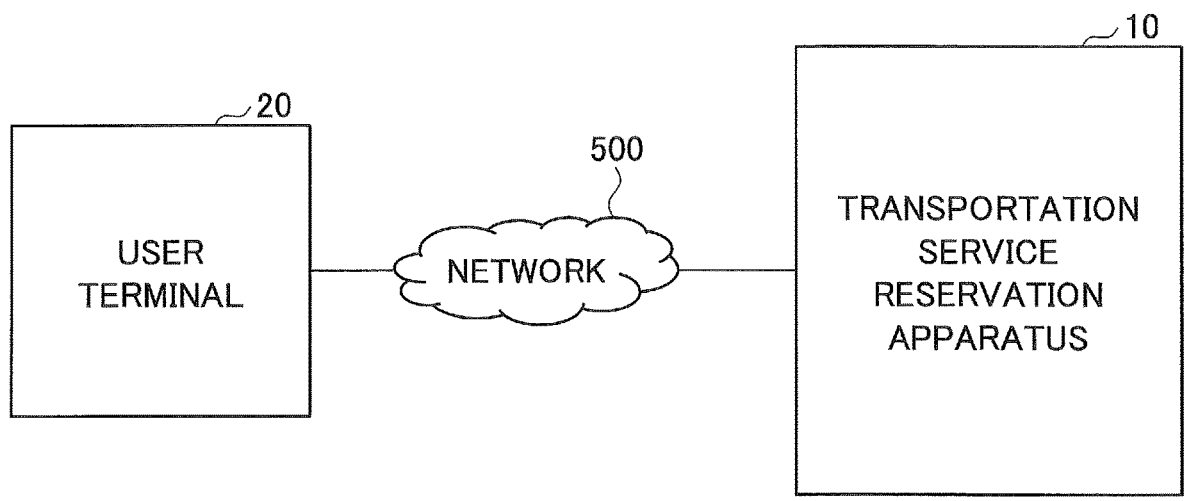
FIG. 1 is a diagram illustrating an example of a configuration of a transportation service reservation system in a first embodiment.

FIG. 1 is a diagram illustrating an example of a configuration of the transportation service reservation system in a first embodiment. In FIG. 1, a transportation service reservation system 1 includes a transportation service reservation apparatus 10, one or more user terminals 20, or the like. The transportation service reservation apparatus 10 and each user terminal 20 are communicably connected via a communication network 500, such as the Internet, a telephone network, or the like.

The transportation service reservation apparatus 10 may be a computer that executes processes to book reservations of transportation services and to generate products according to the reservations. The transportation services are defined as services that offer a user transportation to a destination by a vehicle such as an automobile or the like. The products are defined as information indicating service contents of various transportation services that are provided to the user. The transportation service reservation apparatus 10 may be a computer utilized in a certain company that provides the transportation services, for example.

According to the transportation services in this embodiment, services having a plurality of service types can be provided using the same vehicle. The services having the plurality of service types include a taxi service, a shared-taxi service, a mini-bus service, or the like, for example. The number of ride requests to which each service type can simultaneously cope with may mutually differ amongst the plurality of service types. In addition, a route modifying capability may mutually differ amongst the plurality of service types.

The taxi service provides a door-to-door transportation service in response to one ride request. The door-to-door transportation service provides transportation from an origin to a destination that are specified by the user. Accordingly, the user can board the vehicle from an arbitrary location. In addition, "in response to one ride request" means that the number of ride requests to which a single vehicle can simultaneously cope with, or the number of ride requests to which a single vehicle can simultaneously be allocated, for the taxi service, is one.

The shared-taxi service provides a door-to-door transportation service similar to that provided by the taxi service, but can cope with a plurality of ride requests. "Can cope with a plurality of ride requests" means that the number of ride requests to which a single vehicle can simultaneously cope with, or the number of ride requests to which a single vehicle can simultaneously be allocated, for the shared-taxi service, is one or more. Accordingly, in the case of the shared-taxi service, a plurality of users, who may be strangers, may share the same vehicle. In addition, a detour for one user may occur due to a destination of another user, and a travel time of each user may increased compared to the case in which each user uses the taxi service.

The mini-bus service can cope with a plurality of ride requests, but provides a transportation service in which the vehicle travels along a predetermined route. A passenger boards and alights at bus stops located along the route, or at arbitrary locations along the route. Accordingly, in the case of the mini-bus service, a possibility of the travel time of one user increasing due to other users sharing the ride is low. However, each passenger is required to move from origin to the boarding location and to move from the alighting location to the destination. Unlike buses on regular routes or shuttle buses, the mini-bus usually does not travel according to a predetermined time table. When the mini-bus service is allocated to a vehicle, this vehicle provides the mini-bus service.

The transportation service reservation system 1 in this embodiment dynamically allocates one of the taxi service, the shared-taxi service, and the mini-bus service to one vehicle according to demands. The vehicle may have a seating capacity (or riding capacity) of approximately six to eight people, for example. In addition, even when the origin and destination of the vehicle are the same for the taxi service, the shared-taxi service, and the mini-bus service, mutually different fares may be set amongst the taxi service, the shared-taxi service, and the mini-bus service.

In the following description, a term "service type" is used to distinguish the transportation services provided by the taxi service, the shared-taxi service, and the mini-bus service.

The user terminal 20 is a terminal that is used by the user of the transportation service. In other words, the user terminal 20 functions as an input and output interface for the transportation services with respect to the user. Examples of the user terminal 20 include feature phones, smartphones, tablet type devices, PCs (Personal Computers), or the like.

Figure 2:
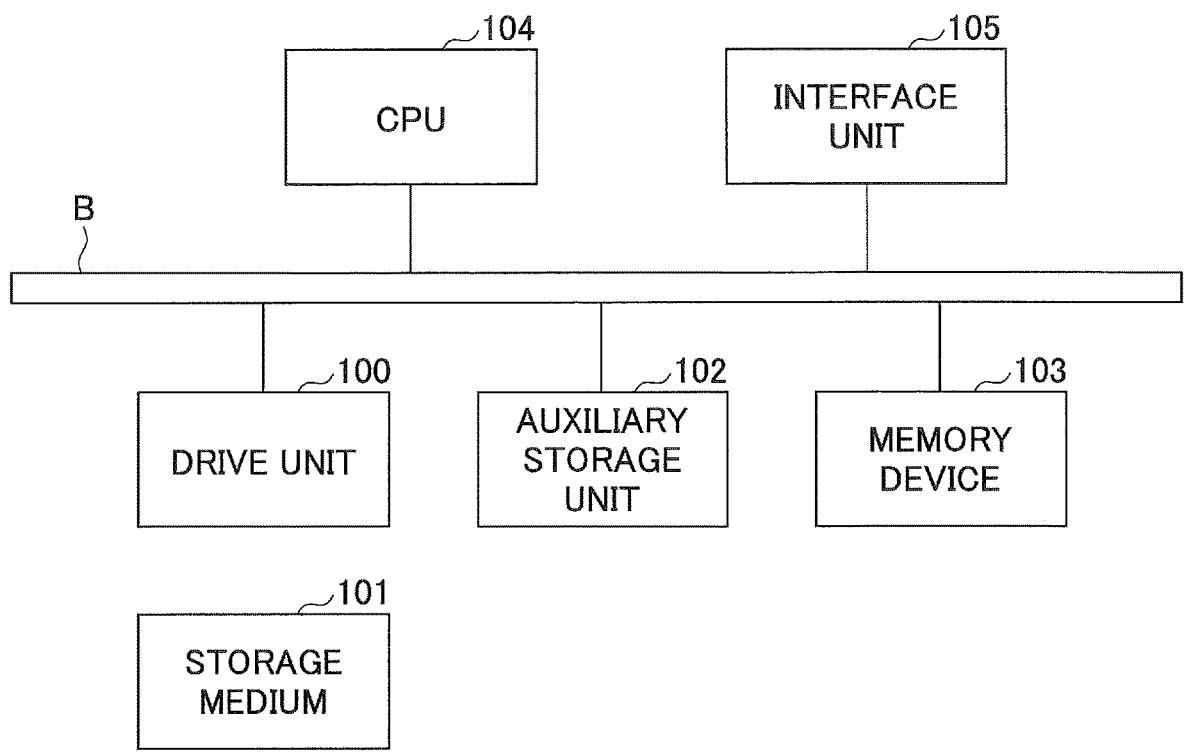
FIG. 2 is a diagram illustrating an example of a hardware configuration of a transportation service reservation apparatus in the first embodiment.

FIG. 2 is a diagram illustrating an example of a hardware configuration of the transportation service reservation apparatus in the first embodiment. The transportation service reservation apparatus 10 illustrated in FIG. 2 includes a drive unit 100, an auxiliary storage unit 102, a memory device 103, a CPU (Central Processing Unit) 104, an interface unit 105, or the like, which are mutually coupled via a bus B.

One or more programs that perform processes of the transportation service reservation apparatus 10 when executed may be stored in a storage medium 101. The storage medium 101 may be formed any suitable non-transitory computer-readable storage medium. When the storage medium 101 that stores at least one program is set on the drive unit 100, the program is installed from the storage medium 101 to the auxiliary storage unit 102 via the drive unit 100. The program does not necessarily have to be installed from the storage medium 101, and for example, the program may be downloaded from another computer via a network. In addition to the installed program, the auxiliary storage unit 102 stores files, data, or the like that are required.

The memory device 103 reads the program from the auxiliary storage unit 102 and stores the read program in the memory device 103 in response to receiving a program start instruction. The CPU 104 performs functions related to the transportation service reservation apparatus 10 according to the program stored in the memory device 103. The interface unit 105 may be used as an interface for connecting the transportation service reservation apparatus 10 to the network.

Examples of the storage medium 101 include portable recording mediums such as a CD-ROM (Compact Disk-Random Access Memory), a DVD (Digital Versatile Disk), a USB (Universal Serial Bus) memory, or the like. In addition, examples of the auxiliary storage unit 102 include a HDD (Hard Disk Drive), a flash memory, or the like. Each of the storage medium 101 and the auxiliary storage unit 102 may form a non-transitory computer-readable storage medium.

Figure 3:
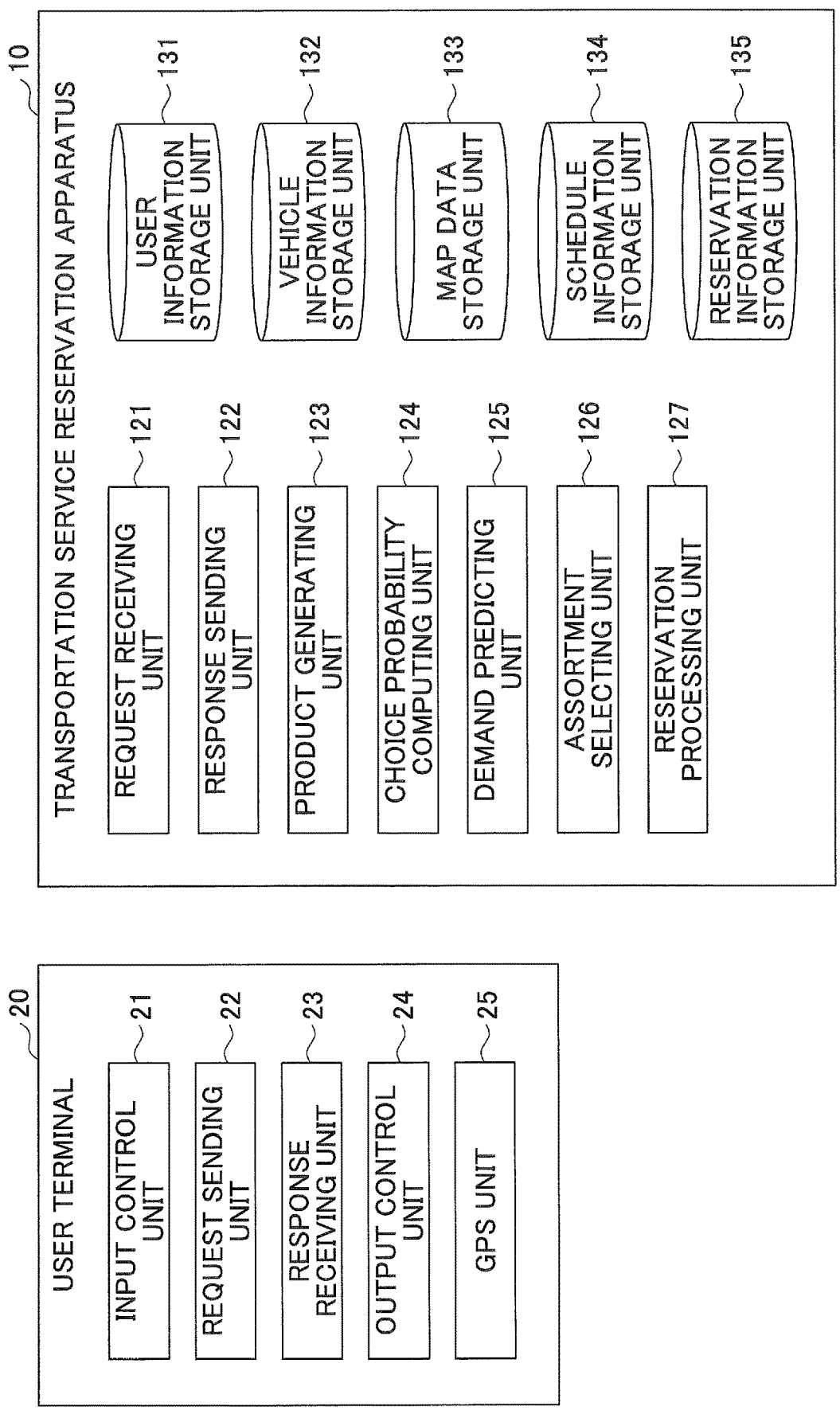
FIG. 3 is a diagram illustrating an example of a functional configuration of the transportation service reservation system in the first embodiment.

FIG. 3 is a diagram illustrating an example of a functional configuration of the transportation service reservation system in the first embodiment. In FIG. 3, the user terminal 20 includes an input control unit 21, a request sending unit 22, a response receiving unit 23, an output control unit 24, a GPS (Global Positioning System) unit 25, or the like. Processes of the input control unit 21, the request sending unit 22, the response receiving unit 23, the output control unit 24, and the GPS (Global Positioning System) unit 25 can be performed when a CPU of the user terminal 20 executes the program installed in the user terminal 20.

The input control unit 21 accepts an instruction input from the user. The request sending unit 22 sends to the transportation service reservation apparatus 10 a request according to the instruction from the user. In this embodiment, the request sending unit 22 sends a request to use the transportation service (hereinafter also referred to as a "ride request") or the like. The response receiving unit 23 receives a response with respect to the request that is sent by the request sending unit 22. The output control unit 24 displays on a display unit of the user terminal 20 information or the like included in the response that is received by the response receiving unit 23. The GPS unit 25 measures a current position of the user based on a GPS signal that is received by the user terminal 20.

The transportation service reservation apparatus 10 includes a request receiving unit 121, a response sending unit 122, a product generating unit 123, a choice probability computing unit 124, a demand predicting unit 125, a assortment selecting unit 126, a reservation processing unit 127, or the like. Processes of the request receiving unit 121, the response sending unit 122, the product generating unit 123, the choice probability computing unit 124, the demand predicting unit 125, the assortment selecting unit 126, and the reservation processing unit 127 can be performed when the CPU 104 of the transportation service reservation apparatus 10 executes the program installed in the transportation service reservation apparatus 10. The transportation service reservation apparatus 10 further includes a user information storage unit 131, a vehicle information storage unit 132, a map data storage unit 133, a schedule information storage unit 134, a reservation information storage unit 135, or the like. Each of the user information storage unit 131, the vehicle information storage unit 132, the map data storage unit 133, the schedule information storage unit 134, the reservation information storage unit 135 may be formed by the auxiliary storage unit 102. In addition, each of of the user information storage unit 131, the vehicle information storage unit 132, the map data storage unit 133, the schedule information storage unit 134, and the reservation information storage unit 135 may be formed by a storage unit that is connected to the transportation service reservation apparatus 10 via the network.

The request receiving unit 121 receives the ride request or the like. The ride request includes a user ID (Identification) which is an example of user identification information, a preferred departure time window or a preferred arrival time window, an origin, a destination, conditions related to the ride, or the like. The current position acquired by the GPS unit 25 may be set as the origin.

The product generating unit 123 refers to schedules stored in the schedule information storage unit 134, and generates feasible products with respect to each vehicle, each service type and each time period based on the ride request.

The schedule is defined as information indicating operation procedures when performing the transportation service. The schedule includes information such as a sequence of stopping locations, an arrival time and a departure time at each stopping location, boarding and alighting passengers at each stopping location, or the like.

The product is defined as information indicating service contents of the transportation service that is provided to the user. The product includes information such as a service type, a pick-up location, an drop-off location, a scheduled pick-up time, a scheduled drop-off time, a fare, or the like.

The generating of the product is defined as a process of newly generating a schedule or updating an existing schedule with respect to the vehicle, according to the ride request, and determining service contents with respect to the user who made the ride request (that is, the user who is the source of the ride request), based on the generated or updated schedule.

The choice probability computing unit 124 computes a choice probability of each product forming an assortment of feasible products, for each assortment satisfying a predetermined condition or a predetermined rule (hereinafter simply referred to as a "predetermined condition"), amongst subsets of a feasible product set generated by the product generating unit 123. The choice probability is defined as a probability that each product will be selected by the user. The predetermined condition may be a condition in which three products of mutually different service types form constituent elements, for example. In this case, one product related to the taxi service, one product related to the shared-taxi service, and one product related to the mini-bus service form each assortment satisfying the predetermined condition. However, the predetermined condition may be appropriately modified according to a policy or the like on what kind of products to be presented to the user. For example, one assortment may include two products of the same service type.

The demand predicting unit 125 computes an expected value of future demands with respect to the transportation service, that is, the expected value of the number of ride requests, for each time period. For example, the demand predicting unit 125 may compute the expected value of the number of ride requests for every fifteen minutes, based on the number of ride request received in the past. In addition, the expected value of the number of ride requests may be computed based on statistical data, such as a population scale in a region in which the transportation services are provided, a person trip survey, or the like. The expected value of the number of ride requests may be computed by taking into consideration information such as a season, a day of week, weather, a travel direction, events in vicinities, or the like in the time period that is a target of demand prediction.

The assortment selecting unit 126 selects a combination of the products presented to the user, from the assortments (that is, combinations of products) satisfying the predetermined condition, based on the choice probability and the expected value of the number of ride requests which will be received in the future that are computed as described above. For example, the assortment selecting unit 126 selects the combination of the products that maximizes a sum total of profit of a service provider, or a sum total of current and future utility of the user (hereinafter also simply referred to as a "utility"), based on the choice probability and the expected value of the number of ride requests which will be received in the future. In the following description, a term "assortment" is used to refer the combination of the products.

The response sending unit 122 returns, as the response with respect to the ride request, the information of each product forming the assortment selected by the assortment selecting unit 126. When the product is selected at the user terminal 20 based on the information returned by the response sending unit 122, the request receiving unit 121 receives a product reservation request that includes a result of the product selection.

The reservation processing unit 127 stores the information related to the reserved product in the reservation information storage unit 135 and stores the information related to the schedule of the selected product in the schedule information storage unit 134, according to the product reservation request.

The reservation information storage unit 135 stores information related to the selected products. The information stored in the reservation information storage unit 135 may include the user ID, information related to the schedule of the reservation, the fare, or the like, for example.

The user information storage unit 131 stores information of each user. The information stored in the user information storage unit 131 may include the user ID, name, age, gender, or the like, for example.

The vehicle information storage unit 132 stores information of each vehicle. The information stored in the vehicle information storage unit 132 may include a vehicle type, a seating capacity (or riding capacity), current position information of the vehicle, or the like, for example.

The map data storage unit 133 stores information related to a road network. The information stored in the map data storage unit 133 may be represented by a network having nodes and links, for example. The information stored in the map data storage unit 133 may include latitude and longitude of intersections and various POIs (Points of Interest), lengths and widths of the roads, existing of traffic lights, traffic restrictions, or the like, for example. In addition, the information related to the road network may include traffic information of roads acquired in real-time using various sensors, for example. The traffic information may include a time required for passing each road or the like, for example.

Figure 4A:
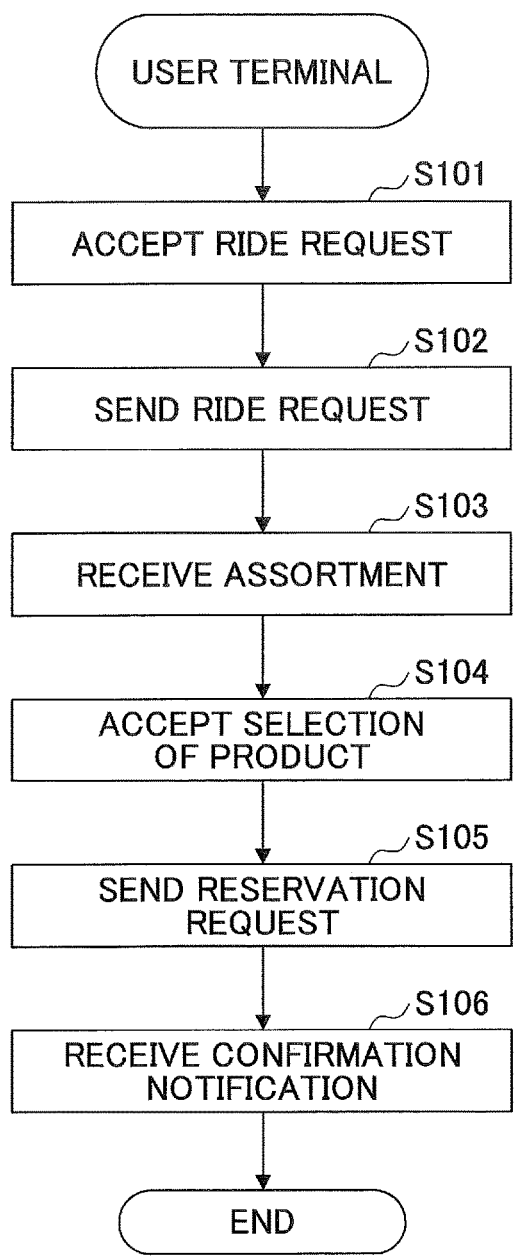
FIGS. 4A and 4B are flow charts for explaining an example of procedures of a transportation service reservation process.
Figure 4B:
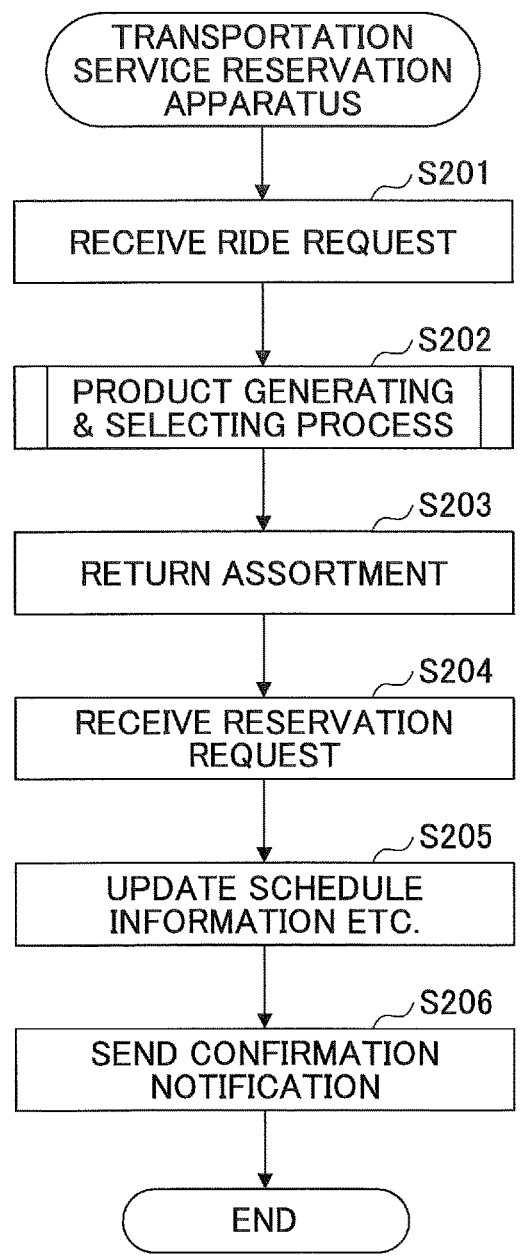

Next, a description will be given of procedures performed by the user terminal 20 and the transportation service reservation apparatus 10, by referring to FIGS. 4A and 4B. FIGS. 4A and 4B are flow charts for explaining an example of procedures of a transportation service reservation process.

In step S101 illustrated in FIG. 4A, the input control unit 21 of the user terminal 20 accepts input of a parameter group related to a ride request from the user. The parameter group may include information such as the user ID, the boarding date, the origin, the destination, or the like. In addition, the parameter group may also include at least one of the preferred departure time window and the preferred arrival time window. Furthermore, the parameter group may further include a number of passengers or a number of seats. In a case in which the preferred departure time window or the preferred arrival time window is specified, a specific time may be specified by information such as "8:00" (length of time window is zero), or a time window may be specified by information such as "8:00 to 8:30", for example. In addition, a preferred departure time may be specified by information such as "immediately" or "as soon as possible", for example. In the case of the shared-taxi service or the mini-bus service, a preferred gender of passengers sharing the side may be specified so that all passengers of the vehicle are of the same gender, for example.

Next, in step S102, the request sending unit 22 of the user terminal 20 sends the ride request including the input parameters to the transportation service reservation apparatus 10. In step S201 illustrated in FIG. 4B, the request receiving unit 121 of the transportation service reservation apparatus 10 receives the ride request.

Then, in step S202, the transportation service reservation apparatus 10 performs a product generating and selecting process to generate the products and to select the assortment, by referring to the schedule information storage unit 134 according to the ride request.

FIG. 5 is a diagram illustrating an example of schedule information stored in the schedule information storage unit. FIG. 5 illustrates the schedule information amounting to one day for a certain vehicle. In FIG. 5, one block represented by a rectangular outer frame is related to one service type. In the following description, each block may also be referred to as "schedule block".

In FIG. 5, a schedule block $S_3$ of the mini-bus service is allocated after a schedule block $S_1$ of the taxi service, with respect to the vehicle. In other words, the time progresses in a direction from left to right in FIG. 5.

A schedule block (hereinafter also referred to as an "empty schedule block") $S_2$ in which the vehicle travels in an empty state from a final stopping location of the shared-taxi service to a first stopping location of the mini-bus service, is inserted between the schedule block $S_1$ of the shared-taxi service and the schedule block $S_3$ of the mini-bus service. Each schedule block may include information such as a schedule ID, the service type, the stopping location, the arrival time, the departure time, a boarding passenger list, an alighting passenger list, or the like, for example.

The schedule ID is defined as identification information of each schedule block. The service type is defined as the service type of each schedule block. The service type of the empty schedule block is indicated as "empty" in FIG. 5. The stopping location is defined as information specifying a region, an address, latitude and longitude, or the like.

The arrival time is defined as scheduled time of arrival at the stopping location. The departure time is defined as scheduled time of departure from the stopping location. The boarding passenger list is defined as a list of the user IDs of the users boarding at the stopping location. The alighting passenger list is defined as a list of the user IDs of the users alighting at the stopping location.

Figure 6:
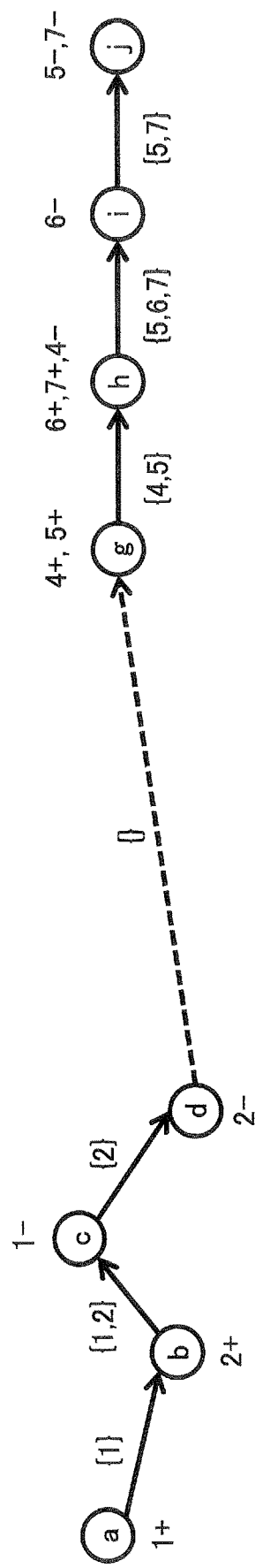
FIG. 6 is a diagram illustrating an example of a behavior of a vehicle obtained from the schedule information.

FIG. 6 is a diagram illustrating an example of a behavior of the vehicle obtained from the schedule information. FIG. 6 illustrates the behavior of the vehicle obtained from the schedule information illustrated in FIG. 5 in a form of a directed graph.

Each node of the directed graph indicates the stopping location. An alphabet letter within the node corresponds to the value of the stopping location illustrated in FIG. 5. A numerical value affixed to each node indicates the user ID of the user boarding or alighting at the stopping location. The numerical value having a plus sign "+" added in front thereof indicates the user ID of the boarding user, and the numerical value having a minus sign "−" added in front thereof indicates the user ID of the alighting user. Numerals in brackets "( )" indicated on the directed graph indicate the user IDs of the users transported between the two stopping locations connected by the directed graph.

In the product generating process, the schedule block is newly generated, or the existing schedule block is updated, in order to provide a service according to the ride request, and the product is generated based on the generated or updated schedule block. The scheduled pick-up time, the scheduled drop-off time, or the like of each product may differ for each vehicle, according to the empty (or vacant) state or the reservation state of the vehicle, the current position of the vehicle, or the like. In addition, in the case of the mini-bus service, at least one of the boarding location and the alighting location may differ from those of the ride request, according to the route of the vehicle to which the mini-bus service is allocated.

The scheduled pick-up time and the scheduled drop-off time of the product that is generated do not necessarily have to match the preferred departure time window and the preferred arrival time window specified by the ride request, respectively. The product may be generated for each time period that is within a predetermined time range before or after the preferred departure time window or the preferred arrival time window specified by the ride request. For example, in a case in which the preferred departure time window is "8:00 to 8:30", the product may be generated in the time period that is within one hour before or after the preferred departure time window.

The assortment selecting process selects the assortment to be presented to the user. First, the assortment selecting process computes the choice probability of each product forming the assortment, for every assortment satisfying the predetermined condition, amongst the subsets of the feasible product set that is generated. Then, the product selecting process computes the expected value of the number of ride requests which will be received in the future, for each time period, within the predetermined time range before or after the preferred departure time window or the preferred arrival time window specified by the ride request. Next, the assortment selecting process selects the assortment to be presented to the user, from the set of assortment satisfying the predetermined condition, based on the choice probability and the expected value of the number of ride requests which will be received in the future that are computed as described above.

Next, in step S203, the response sending unit 122 of the transportation service reservation apparatus 10 returns the information related to each product forming the assortment, to the user terminal 20 at a sending source of the ride request. The information related to each product forming the assortment may include the service type, the pick-up location, the drop-off location, the scheduled pick-up time, the scheduled drop-off time, the fare, or the like, for example.

In step S103, the response receiving unit 23 of the user terminal 20 receives the returned information related to each product forming the assortment. The output control unit 24 of the user terminal 20 displays each product included in the received information as selectable options. The user can decide on the product the user wishes to use, by comparing the service type, the pick-up location, the drop-off location, the scheduled pick-up time, the scheduled drop-off time, the fare, or the like of the products that are presented on the display.

Figure 7:
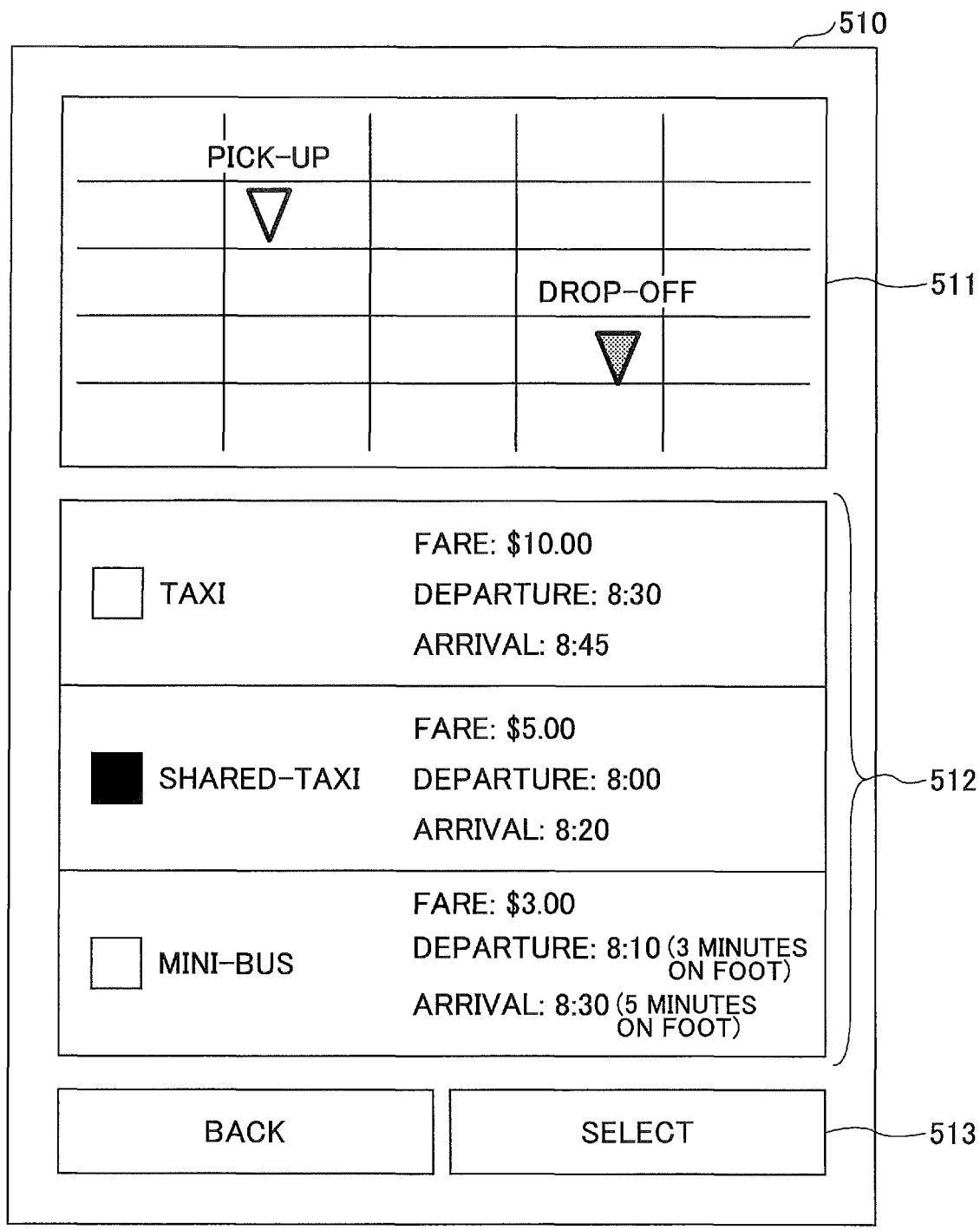
FIG. 7 is a diagram illustrating an example of a display of assortment.

FIG. 7 is a diagram illustrating an example of the display of the options of the products. A screen 510 illustrated in FIG. 7 includes a map region 511, an option list region 512, or the like.

The option list region 512 displays the service type, the scheduled pick-up time, the scheduled drop-off time, the fare, or the like for each product. A travel time required to walk to the pick-up location or to walk from the drop-off location may also be displayed with respect to the mini-bus service, as illustrated in brackets in FIG. 7. Each of the products is exclusively selectable by the user on the option list region 512. When the user selects one of the products, the pick-up location and the drop-off location of the selected product is displayed on the map region 511.

Next, in step S104, the input control unit 21 of the user terminal 20 accepts the selection of one product from the products that are displayed as the selectable options. For example, the selection of one of the products is accepted when the user selects the product the user wishes to use on the screen 510 illustrated in FIG. 7 and pushes an enter button 513 on the screen 510. In step S105, the request sending unit 22 sends to the transportation service reservation apparatus 10 a reservation request including the schedule ID of the selected product, for example, according to the selection of the product.

In step S204, the request receiving unit 121 of the transportation service reservation apparatus 10 receives the reservation request. In step S205, the reservation processing unit 127 updates the schedule information stored in the schedule information storage unit 134 according to the received reservation request, and adds new reservation request to the reservation information storage unit 135 according to the received reservation request. More particularly, the schedule information of the vehicle related to the selected product is updated. In addition, the reservation information related to the reservation request is stored in the reservation information storage unit 135.

FIG. 8 is a diagram illustrating an example of a configuration of the reservation information storage unit. In FIG. 8, the reservation information storage unit 135 stores the user ID, the schedule ID, the boarding location, the alighting location, the boarding date, the scheduled pick-up time, the scheduled drop-off time, the fare, or the like with respect to the reserved products.

The user ID is defined as the ID of the user at the source of the reservation request. The schedule ID is defined as the ID of the schedule related to the reserved product. The pick-up location and the drop-off location are defined as the pick-up location and the drop-off location of the product. The scheduled pick-up time and the scheduled drop-off time are defined as the scheduled pick-up time and the scheduled drop-off time of the product. The fare is defined as the fare of the product. For example, the fare may be computed based on the service type, a riding distance (or travel distance), or the like.

An example of updating the schedule information will be described later in the specification.

Next, in step S206, the response sending unit 122 returns a confirmation notification confirming completion of the reservation to the user terminal 20. In step S106, the response receiving unit 23 of the user terminal 20 receives the confirmation notification. The output control unit 24 may display on the screen of the user terminal 20 information indicating the completion of the reservation, based on the confirmation notification that is received by the response receiving unit 23.

Figure 9:
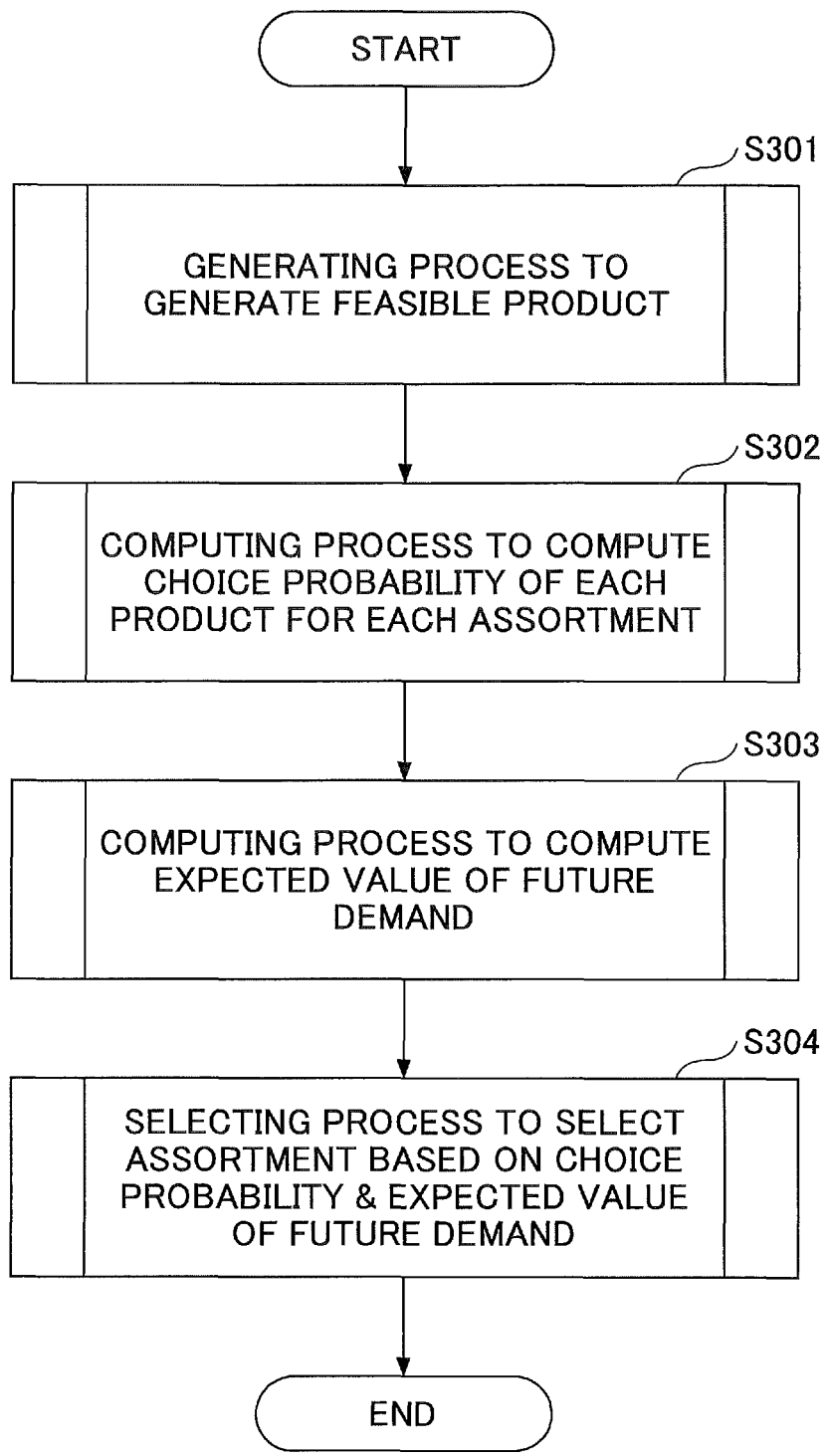
FIG. 9 is a flow chart for explaining an example of procedures of a product generating and assortment selecting process.

Next, a more detailed description will be given of the product generating and selecting process of step S202. FIG. 9 is a flow chart for explaining an example of procedures of the product generating and selecting process.

In step S301 illustrated in FIG. 9, the product generating unit 123 generates a feasible product for each vehicle, each service type, and each time period, based on the ride request from the user and the schedule information of each vehicle. For the sake of convenience in the following description, a vehicle that is a processing target is denoted as a vehicle n, a service type that is a processing target is denoted as a service m, and a time period that is a processing target is denoted as a time period l. A value of the vehicle n is 1 to N, where N denotes a number of vehicles stored in the vehicle information storage unit 132. A value of the service m indicates the taxi service, the shared-taxi service, or the mini-bus service. A value of the time period l is any of time periods that are obtained by segmenting a predetermined time range before or after the preferred departure time window by a predetermined width. For example, in a case in which the preferred departure time window is "8:00 to 8:30", the predetermined time range of one hour before or after the preferred departure time window is "7:00 to 9:30", and the predetermined time range is segmented with the predetermined time width of fifteen minutes, the time period l becomes any one of "7:00 to 7:15", "7:15 to 7:30", . . . , "9:00 to 9:15", and "9:15 to 9:30".

In addition, in the following description, a product (or option) $p_{n,m,l}$ indicates the product (or option) related to the service m provided by the vehicle n in the time period l. When a set of the products with respect to all combinations of the vehicles, the service types, and the time periods is denoted by P, a set F of feasible products becomes a subset of the set P. In addition, a set A of the assortment is a subset of the set F. Hence, the following relationship (1) stands, where "taxi", "shared", and "bus" respectively represent the taxi service, the shared-taxi service, and the mini-bus service.

$$A \subseteq F \subseteq P = \{p_{n,m,l}\} \quad (1)$$

$n \in N$, $m \in M$, $l \in L$

N: A set of all vehicles
M: A set {taxi, shared, bus} of service type
L: A set of time periods Next, in step S302, the choice probability computing unit 124 computes the choice probability of each product, for each combination of the products satisfying the predetermined condition, amongst a power set of the set F of feasible products.

Next, in step S303, the demand predicting unit 125 computes the future demand, that is, the expected value of the number of ride requests which will be received in the future, for each time period l.

Next, in step S304, the assortment selecting unit 126 selects the assortment, from the set of assortments satisfying the predetermined condition, based on the choice probability that is computed by the choice probability computing unit 124 and the expected value of the number of ride request which will be received in the future that is computed by the demand predicting unit 125.

Figure 10:
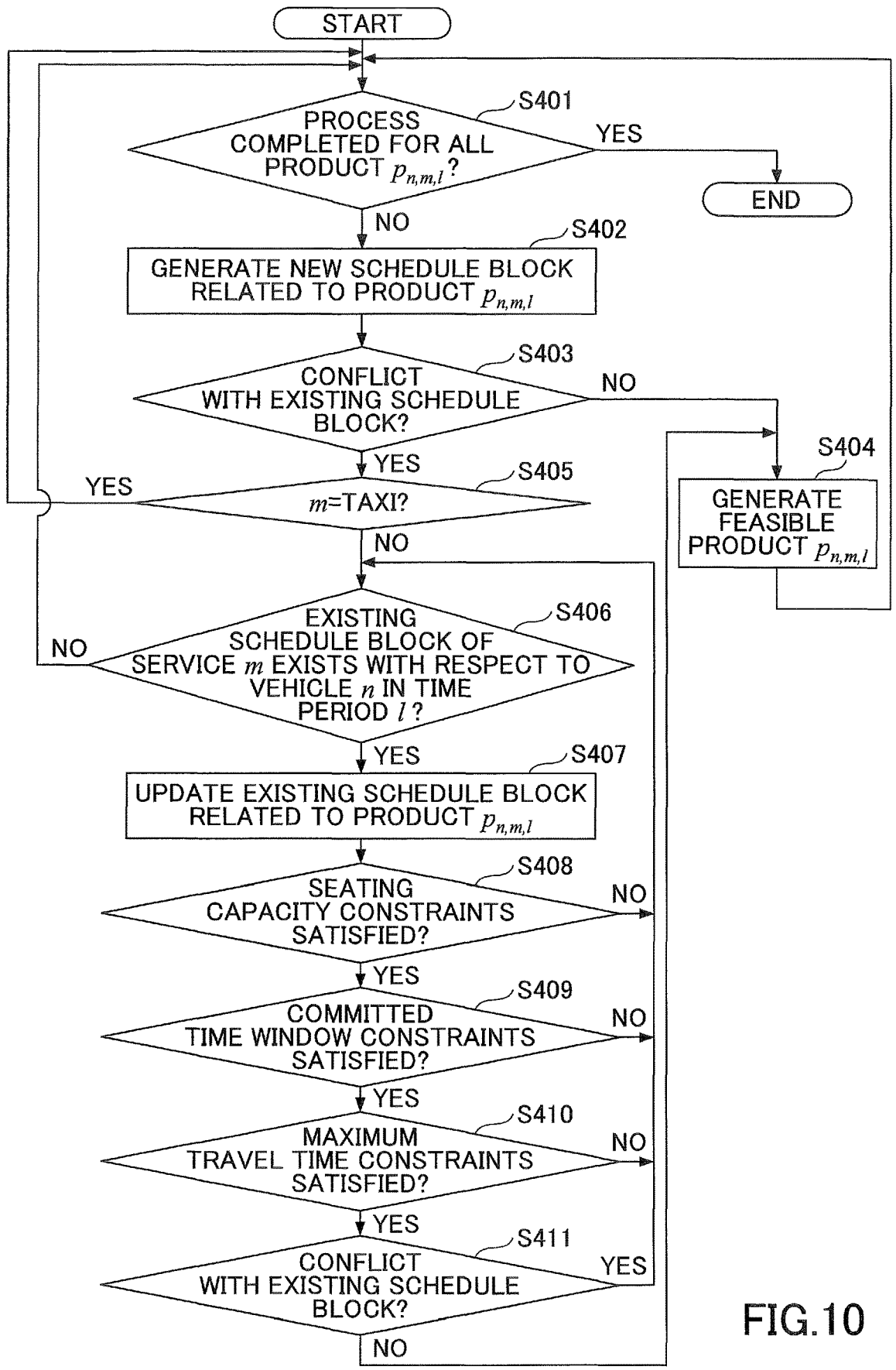
FIG. 10 is a flow chart for explaining an example of procedures of a feasible product generating process.

Next, a more detailed description will be given of a feasible product generating process of step S301. FIG. 10 is a flow chart for explaining an example of procedures of the feasible product generating process.

In step S401 illustrated in FIG. 10, the product generating unit 123 performs processes of step S402 and subsequent steps, with respect to all combinations of the vehicle n, the service m, and the time period l. In step S402, the product generating unit 123 attempts to newly generate a schedule block (hereinafter also referred to as a "new schedule block") related to the vehicle n, the service m, and the time period l, based on the ride request.

FIG. 11 is a diagram illustrating an example of a first updating of the schedule information. FIG. 11 illustrates an example of updating the schedule information illustrated in FIG. 5. FIG. 11 illustrates an example in which a new schedule block $S_4$ of the taxi service is inserted between the schedule block $S_1$ of the shared-taxi service and the schedule block $S_3$ of the mini-bus service. Due to the insertion of the new schedule block $S_4$, an empty schedule block $S_5$ is inserted between the schedule blocks $S_1$ and $S_4$, and an empty schedule block $S_6$ is inserted between the schedule blocks $S_4$ and $S_3$. The user ID of the user of the new schedule block $S_4$ is "3".

The product obtained from the new schedule block does not necessarily have to satisfy all of the conditions of the ride request from the user. For example, a predetermined tolerance time ($\pm\alpha$) may be tolerated between the preferred departure time window or arrival time window specified by the ride request from the user and the corresponding scheduled pick-up time or drop-off time of the product obtained from the new schedule block.

A route search related to the schedule block $S_4$, and a route search related to the schedule block $S_4$ and the empty schedule block $S_6$ may be performed using map data stored in the map data storage unit 133, a known search technique, or the like, for example.

Next, in step S403, the product generating unit 123 judges whether a conflict exists between the existing schedule blocks allocated to the vehicle n and the new schedule block. More particularly, a judgment is made to determine whether the travel time can be secured between the new schedule block and the existing schedule blocks before or after the new schedule block.

In a case in which there is no conflict between the existing schedule blocks and the new schedule block and the judgment result in step S403 is NO, the product generating unit 123 in step S404 generates the feasible product $p_{n,m,l}$ with respect to the user, based on the new schedule block. More particularly, the information such as the service type, the pick-up location, the drop-off location, the scheduled pick-up time, the scheduled drop-off time, the fare, or the like is determined based on the new schedule block. The new schedule block is stored in the memory device 103. In other words, according to the example illustrated in FIG. 11, the information of the new schedule block $S_4$ is stored in the memory device 103. At a point in time when the process of step S404 is performed, the reservation of the new schedule block is not yet committed, and the schedule information of the new schedule block is not reflected to the schedule information storage unit 134.

On the other hand, in a case in which a conflict exists between the existing schedule block and the new schedule block and the judgment result in step S403 is YES, the product generating unit 123 updates the existing schedule block in order to judge whether the service with respect to the current ride request can be provided.

First in step S405, the product generating unit 123 judges whether the service m is the taxi service. In a case in which the service m is the taxi service and the judgment result in step S405 is YES, the product generating unit 123 judges that the product providing the service m by the vehicle n cannot be generated, because the product related to the taxi service is exclusively used by one ride request and the product can only be generated as the new schedule block. In this case, the process returns to step S401, and the process is performed with respect to another product $p_{n,m,l}$.

In a case in which the service m is other than the taxi service and the judgment result in step S405 is NO, the product generating unit 123 in step S406 judges whether an existing schedule block of the same service type as the service m exists with respect to the vehicle n in the time period l of the product $p_{n,m,l}$ that is the processing target. In a case in which a corresponding existing schedule block does not exist and the judgment result in step S406 is NO, the product generating unit 123 judges that the product providing the service m by the vehicle n cannot be generated, because one vehicle cannot simultaneously provide the shared-taxi service and the mini-bus service. In this case, the process returns to step S401, and the process is performed with respect to another product $p_{n,m,l}$.

In a case in which an existing schedule block of the same service type as the service m exists with respect to the vehicle n in the time period l of the product $p_{n,m,l}$ exists and the judgment result in step S406 is YES, the product generating unit 123 in step S407 updates the existing schedule block related to the product $p_{n,m,l}$.

FIG. 12 is a diagram illustrating an example of a second updating of the schedule information. FIG. 12 illustrates an example of updating the schedule information illustrated in FIG. 5. FIG. 12 illustrates an example in which the existing schedule block $S_1$ of the shared-taxi service is updated into a schedule block $S_1'$. In other words, FIG. 12 illustrates an example in which transportation of the user making a new ride request is provided by updating the existing schedule block.

More particularly, the schedule block $S_1'$ is the result of inserting two stopping locations (stopping locations e and f) corresponding to the origin and destination specified by the new ride request into the existing schedule block $S_1$. In addition, in the schedule block $S_1'$, the arrival time and the departure time are updated for the stopping locations beyond each of the stopping locations that are inserted. The addition of the stopping location means the insertion of a new route with respect to the existing schedule block, because time is required to travel along the new route. A method of inserting the stopping location corresponding to the ride request into the existing schedule block depends on a scheduling and routing algorithm, however, a boarding order and an alighting order of each passenger may be determined so as to minimize a total travel distance of the vehicle. In addition, the new route that is generated by the addition of the stopping location and the time required to travel along the new route may be computed using a known route search technique or the like. In FIG. 12, the user ID of the user who alights at the added stopping location, that is, the user who is the source of the ride request resulting in the updating of the schedule block $S_1$, is "3".

The schedule information updated in step S407 is working-level schedule information of the vehicle n copied from the schedule information storage unit 134 to the memory device 103, for example.

Next, a judgment is made to determine whether the existing schedule block after the updating (hereinafter also referred to as an "updated schedule block") satisfies the predetermined condition. More particularly, in step S408, the product generating unit 123 judges whether the updated schedule block satisfies seating (or riding) capacity constraints of the vehicle n, because the number of passengers should not exceed the seating (or riding) capacity of the vehicle n. The seating (or riding) capacity of the vehicle n may be specified by referring to the vehicle information storage unit 132, for example.

In a case in which the updated schedule block satisfies the seating (or riding) capacity constraints of the vehicle n and the judgment result in step S408 is YES, the product generating unit 123 in step S409 judges whether differences between the pick-up time and drop-off time of the updated schedule block and the corresponding pick-up time and drop-off time notified to each user at the time of the reservation of the product related to the existing schedule block before being updated to the updated schedule block are within respective threshold values, for each user of the updated schedule block. This judgment is made in order to prevent a situation in which the vehicle does not arrive at the pick-up location or drop-off location even after a long time elapses from the scheduled pick-up time or the scheduled drop-off time. More particularly, the product generating unit 123 retrieves a record including the schedule ID of the updated schedule block, from the reservation information storage unit 135 illustrated in FIG. 8. The product generating unit 123 computes the differences between the pick-up time and the drop-off time of the record and the corresponding pick-up time and drop-off time with respect to the user ID of the record in the information of the updated schedule block (for example, schedule $S_1'$ in FIG. 12) within the memory device 103, for each record that is retrieved. The product generating unit 123 judges whether the computed differences are within the respective threshold values. For example, the threshold values may be prescribed according to a terms of the transportation service. In a case in which the differences are within the respective threshold values for all of the records (or users), it is judged that the terms of the transportation service are satisfied. In a case in which the differences exceed the respective threshold values for at least one record (or user), it is judged that the terms of the transportation service is not satisfied.

In a case in which committed time window constraints related to the pick-up time and the drop-off time notified at the time of the reservation are satisfied and a judgment result in step S409 is YES, the product generating unit 123 in step S410 judges whether a travel time (or riding time) is a maximum (hereinafter also referred to as a "maximum travel time") or less with respect to the user who made the ride request and the other users of the updated schedule block. In other words, in step S410, the product generating unit 123 judges whether maximum travel time constraints are satisfied with respect to the user who made the ride request and the other users of the updated schedule block, in order to prevent considerable deterioration of the service level due to increased travel time caused by the shared ride. More particularly, the product generating unit 123 refers to the updated schedule block (for example, the schedule block $S_1$ illustrated in FIG. 12), and computes the travel time of each user by subtracting the pick-up time from the drop-off time for each user ID. The product generating unit 123 judges whether the computed travel time is less than or equal to the maximum travel time. The maximum travel time may be computed with reference to a travel time for each user ID using the taxi service, for example. That is, the maximum travel time may differ for each user. In a case in which the travel time of all of the users is less than or equal to the maximum travel time, it is judged that the maximum travel time constraints are satisfied.

In the case in which the maximum travel time constraints are satisfied and the judgment result in step S410 is YES, the product generating unit 123 in step S411 judges whether a conflict exists between the updated schedule block and the other existing schedule blocks allocated to the vehicle n. More particularly, a judgment is made to determine whether the travel time can be secured between the updated schedule block and the existing schedule blocks before or after the new schedule block.

In a case in which there is no conflict between the updated schedule block and the other existing schedule blocks and the judgment result in step S411 is NO, the product generating unit 123 in step S404 generates the feasible product $p_{n,m,l}$ with respect to the user, based on the updated schedule block. More particularly, the information such as the service type, the pick-up location, the drop-off location, the scheduled pick-up time, the scheduled drop-off time, the fare, or the like is determined based on the updated schedule block. The updated schedule block is stored in the memory device 103. In other words, according to the example illustrated in FIG. 12, the information of the updated schedule block $S_1$ is stored in the memory device 103. At a point in time when the process of step S404 is performed, the reservation of the updated schedule block is not yet committed, and the schedule information of the updated schedule block is not reflected to the schedule information storage unit 134.

On the other hand, in a case in which the constraints judged in one of steps S408, S409, and S410 are not satisfied and the judgment result in one of steps S408, S409, and S410 is NO, or in a case in which the conflict exists between the updated schedule block and the other existing schedule blocks and the judgment result in step S411 is YES, the product generating unit 123 judges that it is impossible to generate a product that provides the service m with the vehicle n in the time period 1. In this case, the process returns to step S401, in order to perform a process with respect to another product $p_{n,m,l}$.

Hence, in step S401 illustrated in FIG. 10, the product generating unit 123 performs the processes of step S402 and subsequent steps, with respect to all combinations of the vehicle n, the service m, and the time period l. As a result, information illustrated in FIG. 13 is obtained.

Figure 13:
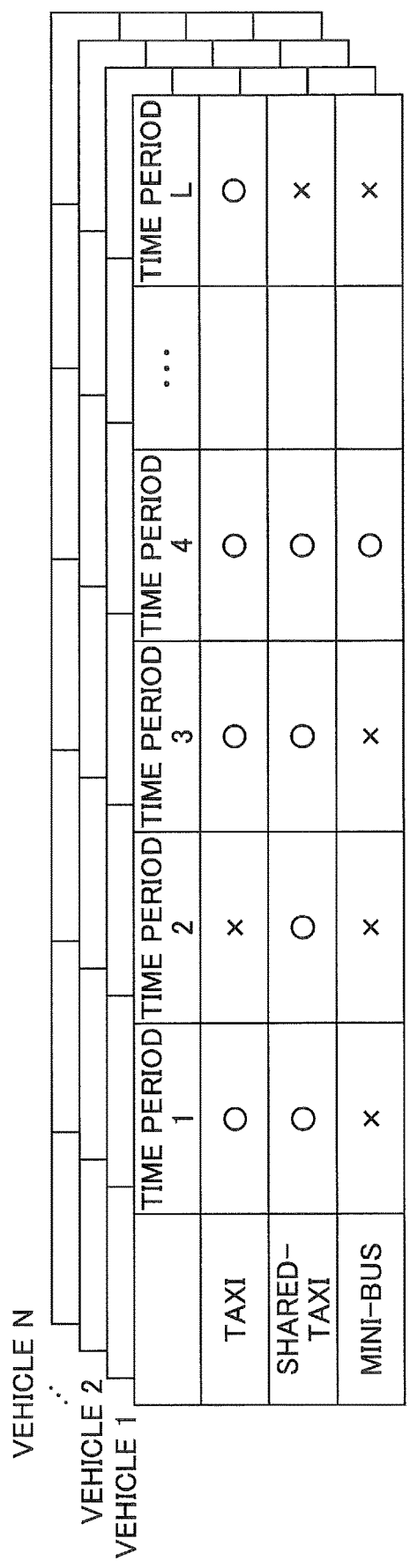
FIG. 13 is a diagram illustrating an example of information obtained by the feasible product generating process.

FIG. 13 is a diagram illustrating an example of the information obtained by the feasible product generating process. In FIG. 13, a matrix of three rows and L columns is represented in a table format with respect to each vehicle. A row direction corresponds to the service type, and the column direction corresponds to each time period.

An element of the matrix is represented by a symbol (or value) "o" or "x". The symbol "o" indicates that the product of the service type of the row can be provided in the time period of the column. On the other hand, the symbol "x" indicates that the product of the service type of the row cannot be provided in the time period of the column. According to the process illustrated in FIG. 10, the schedule information of the product represented by the symbol "o" is stored in the memory device 103, for example.

The set F indicates the set of feasible products stored in the memory device 103 in step S301. In other words, the set F is a set of the products represented by the symbol "o" in FIG. 13.

Next, a more detailed description with respect to the processes of step S302 and subsequent steps in FIG. 9. In step S302 and subsequent steps, a process is performed to select an assortment of the feasible products presented to the user in step S203 illustrated in FIG. 4. In the following description, the assortment of the feasible products may also be referred to as the "set A". The set A is the subset of the set F.

A decision variable $x_{n,m,l}$, which determines whether or not to present the product $p_{n,m,l}$ to the user, is introduced. The product $p_{n,m,l}$ presented to the user when the variable $x_{n,m,l}=1$, and the product $p_{n,m,l}$ is not presented to the user when the variable $x_{n,m,l}=0$. The variable $x_{n,m,l}$ is always zero (0) with respect to the product $p_{n,m,l}$ that is not feasible. A matrix X represented by the following formula (2) is a three-dimensional matrix indicating the assortment of the feasible products.

$$X=\{x_{n,m,l} | x_{n,m,l} \in \{0,1\}\} \qquad (2)$$

$x_{n,m,l}=0 \; \forall p_{n,m,l} \notin F$ n∈N, m∈M, l∈L

N: A set of all vehicles

M: A set {taxi, shared, bus} of service type

L: A set of time periods

The assortment is an element of the power set of the set F, and the user may become confused when the number of products presented to the user is excessively large. In other words, a load on the user to find the desired product may increase when an excessively large number of products are presented to the user. Hence, an upper limit of the number of products presented to the user may be determined for each service type. For example, one product may be presented for the taxi service, one product may be presented for the shared-taxi service, and one product may be presented for the mini-bus service. The upper limit of the number of products presented to the user is one example of the predetermined condition described above.

In this embodiment, it is assumed for the sake of convenience that the user selects the desired product based on MNL (Multinomial Logit Model). Accordingly, in the case in which the assortment represented by the matrix X is presented to the user, a choice probability $\text{Prob}_{n,m,l}(X)$ that the product $p_{n,m,l}$ will be selected by the user may be computed from the following formula (3).

$$Prob_{n,m,l}(X) = \frac{x_{n,m,l}\exp(\mu V_{n,m,l})}{\exp(\mu V_{reject}) + \sum_{n'\in N}\sum_{m'\in M}\sum_{l'\in L}x_{n',m',l'}\exp(\mu V_{n',m',l'})} \quad (3)$$

$V_{n,m,l}$: Utility of product $p_{n,m,l}$
$V_{reject}$: Typical utility for a case in which all services are rejected
$\mu$: Parameter In the formula (3), $V_{n,m,l}$ denotes the utility of the product $p_{n,m,l}$, where the utility refers to a concept used in the field of microeconomics. Hence, the utility $V_{n,m,l}$ represents a satisfaction level of the user obtained by using the product $p_{n,m,l}$.

The utility $V_{n,m,l}$ may be computed according to the following formula (4), for example.

$$V_{n,m,l} = c_{n,m,l} + \Sigma_k \beta_k a_{n,m,l,k} \quad (4)$$

$C_{n,m,l}$: Specific constant of product
$\beta_k$: Parameter
$a_{n,m,l,k}$: k th attribute of product $p_{n,m,l}$ The kth attribute of the option $p_{n,m,l}$ includes the fare, the in-vehicle travel time, a waiting time for the vehicle, out-vehicle travel time, or the like, for example. The value of each attribute can be specified or computed based on the product $p_{n,m,l}$, the ride request, or the like.

In the formula (3), the typical utility $V_{reject}$ for the case in which all services are rejected refers to a case in which none of the products presented to the user are selected by the user. For example, in the case in which none of the products presented to the user are selected by the user, it is possible to assume that the user used other transportation means, and use the value of the utility $V_{reject}$ as an expected value of a utility that is obtained for the case in which such other transportation means is used.

Accordingly, in step S302, the choice probability computing unit 124 computes the choice probability of each product $p_{n,m,l}$ forming the assortment, for each assortment satisfying the predetermined condition, amongst the subsets of the set F, based on a formula that is obtained by substituting the formula (4) into the formula (3).

Next, a more detailed description will be given of the process of step S303. In step S303, the demand predicting unit 125 computes an expected value $Dem_l$ of the number of ride requests received in each time period l. For example, in a case in which the products in the predetermined time range from 7:00 to 9:30 are generated, and the predetermined time range is segmented with the predetermined time width of fifteen minutes, the expected value $Dem_l$ of the number of ride requests received in each time period l is computed for each of the time periods of "7:00 to 7:15", "7:15 to 7:30", ..., "9:00 to 9:15", and "9:15 to 9:30". The expected value of the number of ride requests may be computed based on log data. For example, a mean or deviation of a normal distribution of the number of ride requests may be obtained from data indicating the number of ride requests received in each time period in the past for each day of the week. In addition, the distribution of the number of ride requests may be obtained by categorizing in more detail the data indicating the number of ride requests received in each time period, not only for each day of the week, but also for the information such as the season, the weather, the travel direction, or the like. Furthermore, the distribution of the number of ride requests may be obtained by taking into consideration the information of the events in the vicinities.

Next, a more detailed description will be given of the process of step S304. In step S304, the assortment selecting unit 126 selects the assortment that maximizes the sum total of the profit of the service provider, or the sum total of the utility of the user, amongst the assortments satisfying the predetermined condition. In addition, the future demands are taken into consideration when selecting the assortment to be presented.

In a case in which an assortment corresponding to a certain matrix X is presented to the user, an optimization problem of selecting the assortment that maximizes the sum total of the profit of the service provider or the sum total of the utility of the user may be formulated into the following formula (5), where $R_{current}$ denotes a function that returns the expected value of the profit of the service provider made from the current user or the utility of the current user, and $R_{future}$ denotes a function that returns the expected value of the profit of the service provider made from the future users or the utility of the future users.

$$\text{maximize}_X R_{current}(X) R_{future}(X) \quad (5)$$

subject to $\Sigma_{n \in N} \Sigma_{l \in L} x_{n,m,l} \leq 1 \quad \forall m \in M$ $n \in N$, $m \in M$, $l \in L$
N: A set of all vehicles
M: A set {taxi, shared, bus} of service type
L: A set of time periods By presenting the assortment corresponding to the matrix X satisfying the formula (5), it is possible to maximize the sum total of the profit of the service provider or the sum total of the utility of the user. The constraints of the formula (5) guarantees that in the case of the options presented to the user, only one product is included at the most with respect to each service.

In the case in which the assortment corresponding to the certain matrix X is presented to the user, the function $R_{current}$ that returns the expected value of the profit of the service provider made from the current user or the utility of the current user may be formulated into the following formula (6).

$$R_{current}(X) = \Sigma_{n \in N} \Sigma_{m \in M} \Sigma_{l \in L} r_{n,m,l} \text{Prob}_{n,m,l}(X) \quad (6)$$

N: A set of all vehicles
M: A set {taxi, shared, bus} of service type
L: A set of time periods In the formula (6), the probability $\text{Prob}_{n,m,l}(X)$ that the product $p_{n,m,l}$ will be selected by the user in the case in which the assortment corresponding to the certain matrix X is presented to the user. In step S302, the choice probability computing unit 124 computes the probability $\text{Prob}_{n,m,l}(X)$. In the formula (6), $r_{n,m,l}$ denotes the profit of the service provider made from the current user or the utility of the current user.

On the other hand, when maximizing the expected value of the utility of the user, the formula (6) may be rewritten into the following formula (7).

$$R_{current}(X) = \frac{1}{\mu} \ln\left(\sum_{n \in N} \sum_{m \in M} \sum_{l \in L} x_{n,m,l} \exp(\mu V_{n,m,l})\right) \quad (7)$$

It may be difficult to strictly define the function $R_{future}$ that returns the expected value of the profit of the service provider made from the future users or the utility of the future users. For this reason, the formula (5) may be approximated by the following formulas or relationships (8.1) through (8.7) (hereinafter also referred to as "formulas (8)").

$$\text{maximize } R_{current}(X)+\Sigma_{l\in L}\tilde{r}_l\hat{z}_l \quad (8.1)$$

$$\text{subject to } \Sigma_{n\in N}\Sigma_{l\in L}x_{n,m,l}\le 1 \quad \forall m\in M \quad (8.2)$$

$$z_{n,m,l}\le \text{Cap}_{n,m,l}\cdot x_{n,m,l} \quad \forall n\in N, \forall m\in M, \forall l\in L \quad (8.3)$$

$$\hat{z}_l\le \Sigma_{n\in N}\Sigma_{m\in M}z_{n,m,l} \quad \forall l\in L \quad (8.4)$$

$$\hat{z}_l\le Q_\tau(\text{Dem}_l) \quad \forall l\in L \quad (8.5)$$

$$\hat{z}_l\ge 0 \quad \forall l\in L \quad (8.6)$$

$$z_{n,m,l}\ge 0 \quad \forall n\in N, \forall m\in M, \forall l\in L \quad (8.7)$$

In the formula (8.1), a first term represents the expected value of the profit of the service provider made from the current user or the utility of the current user in the case in which the assortment corresponding to the certain matrix X is presented to the user. A second term in the formula (8.1) represents the expected value of the profit of the service provider made from the future users or the utility of the future users in the case in which the assortment corresponding to the certain matrix X is presented to the current user. In the formula (8.1), $$\hat{z}_l$$

denotes a sum total of a number of seats to be reserved for the time period l, $$\tilde{r}_l$$

denotes an average value of the profit of the service provider made from the user or the utility of the user (hereinafter also simply referred to as the average value of "profit or utility") in the time period l, and $$\text{Dem}_l$$

denotes the demands (that is, the number of ride requests) in the time period l. In other words, $\text{Dem}_l$ is a random variable of the number of ride requests, and it is assumed that $\text{Dem}_l$ follows a normal distribution.

In addition, $$\tilde{r}_l, \text{Dem}_l$$

can respectively be computed from the past data.

In the constraint (8.3) $z_{n,m,l}$ denotes a number of seats to be reserved for future users who will use the service m provided by the vehicle n in the time period l. In addition, $\text{Cap}_{n,m,l}$ denotes a number of remaining seats that can be used for the service m provided by the vehicle n in the time period l.

The constraint (8.3) indicates that the judgment on the assortment (or option set) to be presented with respect to the current ride request affects the future ride requests. Actually, after the products are presented, the number of remaining seats decreases only after the user selects the desired product, however, it is unknown at a stage in which the products are presented whether the user will actually select one of the presented products in the assortment. Hence, for the sake of simplicity, it is assumed that the number of remaining seats for the future users decreases at a timing when the products are presented to the user.

In the constraint (8.4), $$\hat{z}_l$$

denotes a sum total of the number of seats to be reserved for the time period l, and the constraint (8.4) guarantees that this sum total is less than or equal to a total number of seats to be reserved for the future users for each service to be provided by each vehicle in the time period l.

In the constraint (8.5), $$\hat{z}_l$$

denotes a sum total of the number of seats to be reserved for the time period l, and the constraint (8.5) indicates that a certain percentage with respect to the future demands is an upper limit of this sum total. For example, with respect to the distribution $\text{Dem}_l$ of the demands in the time period l, a percentage $Q_\tau(\text{Dem}_l)$ is specified with respect to this distribution by a p-quartile $\tau$. The p-quartile $\tau$ may be specified as 25%, 50%, and 75%, for example. The p-quartile $\tau$ may be set to a small value in a case in which priority is placed on positively increasing the profit of the service provider from the current user, and to a large value in a case in which priority is placed on expecting the profit of the service provider from the future users.

Accordingly, in step S303, the assortment selecting unit 126 can select the assortment presented to current user based on the formula (8).

In the example described above, maximizing the profit of the service provider or maximizing the utility of the user is targeted, however, maximizing an aggregation of the profit of the service provider and the utility of the user may be targeted instead. In addition, each of the choice probability, the profit of the service provider, the utility of the user, and the like may be computed using formulas different from those described above.

According to the first embodiment, when selecting the assortment to be presented to the user, the assortment that maximizes the expected value of the profit or utility is selected based on the choice probability and the expected value of the number of ride requests which will be received in the future. Hence, it is possible to provide to the user the assortment desirable from the viewpoint of the profit of the transportation service provider or the utility of the user. As a result, it is possible to expect an improvement in the profit of the transportation service provider or the utility of the user.

By optimizing the assortment presented to the user, it is possible to reduce the possibility that providing subsequent services with respect to the users will become difficult due to insufficient vehicles, the profit of the service provider will decrease, the future user will be unable to receive the services, or the like. In addition, it is possible to reduce the possibility of presenting to the user an option of the product that will be rejected by the user and for which the service provider will be unable to obtain the profit.

Next, a description will be given of a second embodiment. Only parts of the second embodiment that differ from the first embodiment will be described in the following. Accordingly, unless otherwise indicated, parts of the second embodiment that are not described may be the same as those corresponding parts of the first embodiment.

Figure 14:
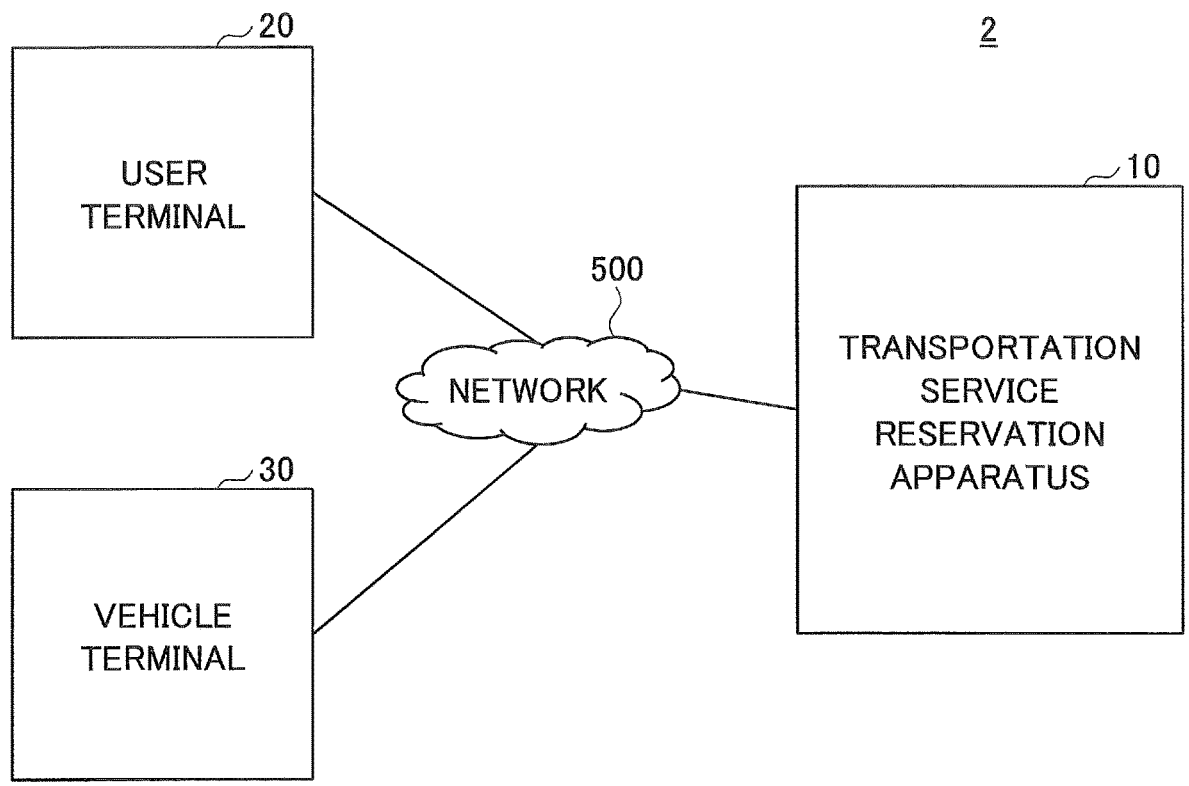
FIG. 14 is a diagram illustrating an example of the configuration of the transportation service reservation system in a second embodiment.

FIG. 14 is a diagram illustrating an example of the configuration of the transportation service reservation system in the second embodiment. In FIG. 14, those parts that are the same as those corresponding parts in FIG. 1 are designated by the same reference numerals, and a description thereof will be omitted.

A transportation service reservation system 2 illustrated in FIG. 14 further includes a vehicle terminal 30. The vehicle terminal 30 is communicably connected to the transportation service reservation apparatus 10 via the communication network 500, such as the Internet, a telephone network, or the like. The vehicle terminal 30 may be a dedicated vehicle-mounted device, a mobile phone of a driver of the vehicle, or the like, for example. In a case in which a conductor of the service provider boards the vehicle in addition to the driver, the vehicle terminal 30 may be a mobile phone of this conductor, for example. In the following description, the "driver" may be replaced by the "conductor".

Figure 15:
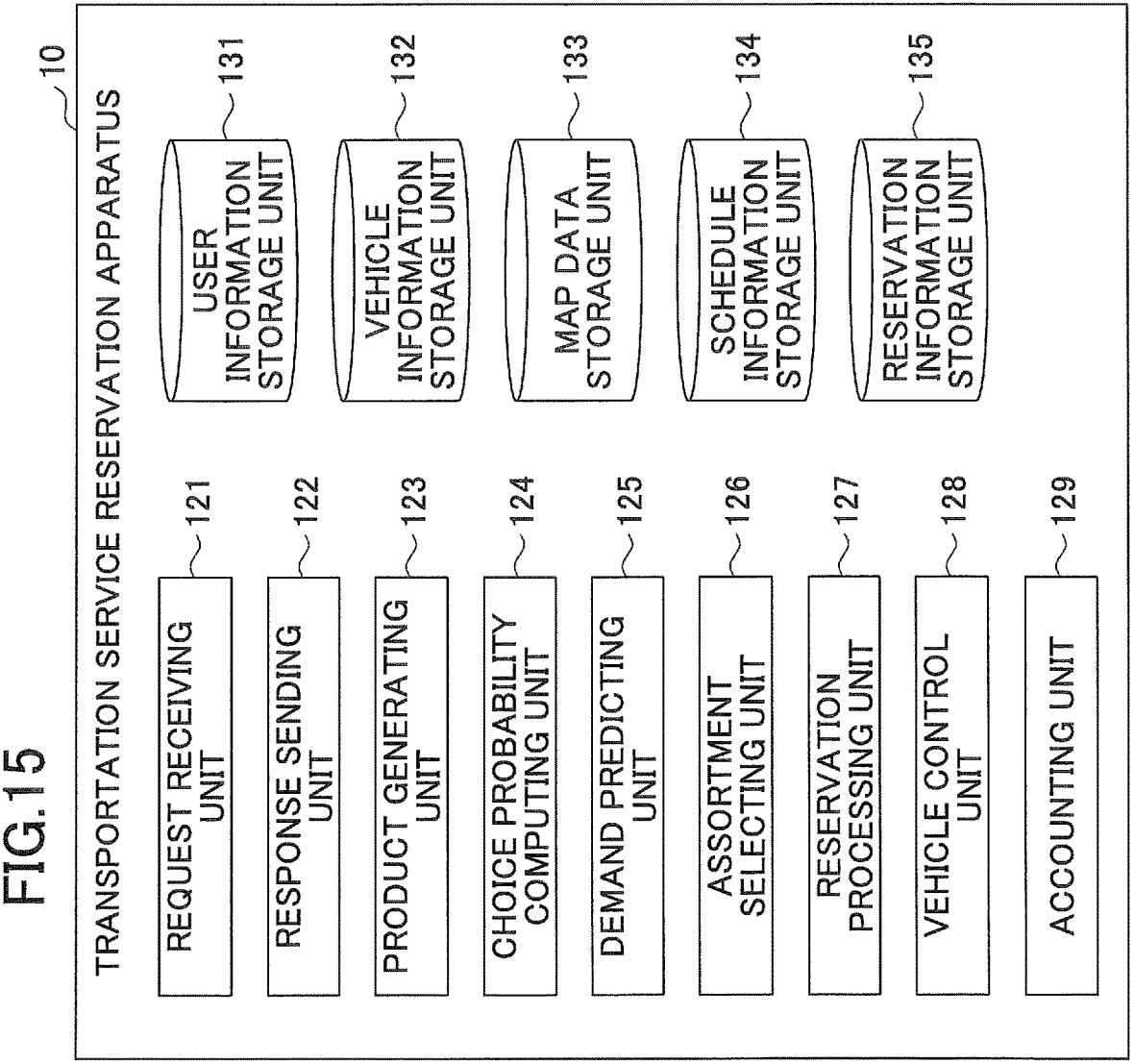
FIG. 15 is a diagram illustrating an example of the functional configuration of the transportation service reservation system in the second embodiment.
Figure 15:
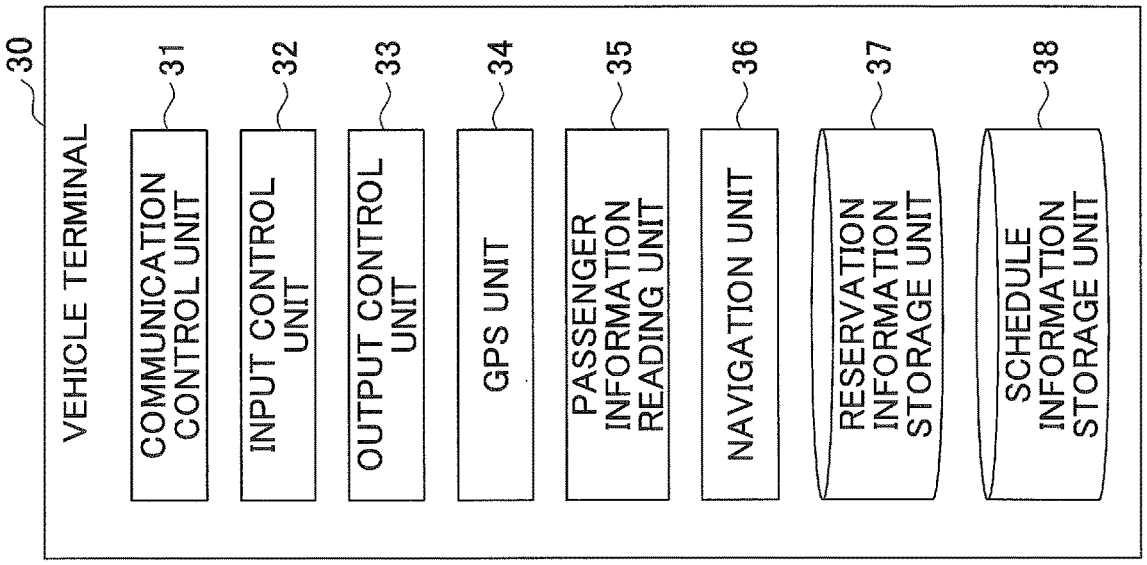

FIG. 15 is a diagram illustrating an example of the functional configuration of the transportation service reservation system in the second embodiment. In FIG. 15, those parts that are the same as those corresponding parts in FIG. 3 are designated by the same reference numerals, and a description thereof will be omitted. In this second embodiment, the functional configuration of the user terminal 20 may be the same as that of the first embodiment, and for this reason, the illustration of the user terminal 20 is omitted in FIG. 15.

In FIG. 15, the vehicle terminal 30 includes a communication control unit 31, an input control unit 32, an output control unit 33, a GPS unit 34, a passenger information reading unit 35, a navigation unit 36, or the like. Processes of the communication control unit 31, the input control unit 32, the output control unit 33, the GPS unit 34, the passenger information reading unit 35, and the navigation unit 36 can be performed when a CPU of the vehicle terminal 30 executes a program installed in the vehicle terminal 30. The vehicle terminal 30 further includes a reservation information storage unit 37, a schedule information storage unit 38, or the like. For example, the reservation information storage unit 37 and the schedule information storage unit 38 may be formed by an auxiliary storage unit of the vehicle terminal 30.

The communication control unit 31 controls communications between the vehicle terminal 30 and the transportation service reservation apparatus 10 or the like. The input control unit 32 accepts inputs from the driver. The output control unit 33 displays information or the like obtained by processes in accordance with the inputs on a display unit of the vehicle terminal 30. The GPS unit 34 measures a current position of the vehicle based on a GPS signal received by the vehicle terminal 30. The passenger information reading unit 35 controls reading of user information from an IC (Integrated Circuit) card (for example, a member's card) or the like owned by each user. The navigation unit 36 navigates the driver by searching a route in accordance with the schedule, providing a guidance on the searched route, or the like.

On the other hand, the transportation service reservation apparatus 10 further includes a vehicle control unit 128, an accounting unit 129, or the like. Processes of the vehicle control unit 128 and the accounting unit 129 can be performed when the CPU 104 of the transportation service reservation apparatus 10 executes a program installed in the transportation service reservation apparatus 10.

In this second embodiment, the vehicle control unit 128 sends the reservation information and the schedule information of the product with respect to the vehicle terminal 30 of the vehicle to which the product related to the reservation request received in step S204 illustrated in FIG. 4 is allocated. The sending of the reservation information and the schedule information may be performed after performing step S206 illustrated in FIG. 4, for example.

When the communication control unit 31 of the vehicle terminal 30 receives the reservation information and the schedule information, the communication control unit 31 stores the reservation information in the reservation information storage unit 37, and stores the schedule information in the schedule information storage unit 38. The output control unit 33 may display the schedule information on the display unit of the vehicle terminal 30, according to receiving the schedule information, or receiving inputs from the driver, or when a predetermined time before a time of the schedule information arrives, or the like. By displaying the schedule information, the driver can confirm a driving schedule. The schedule information may be displayed for each schedule block.

Figure 16:
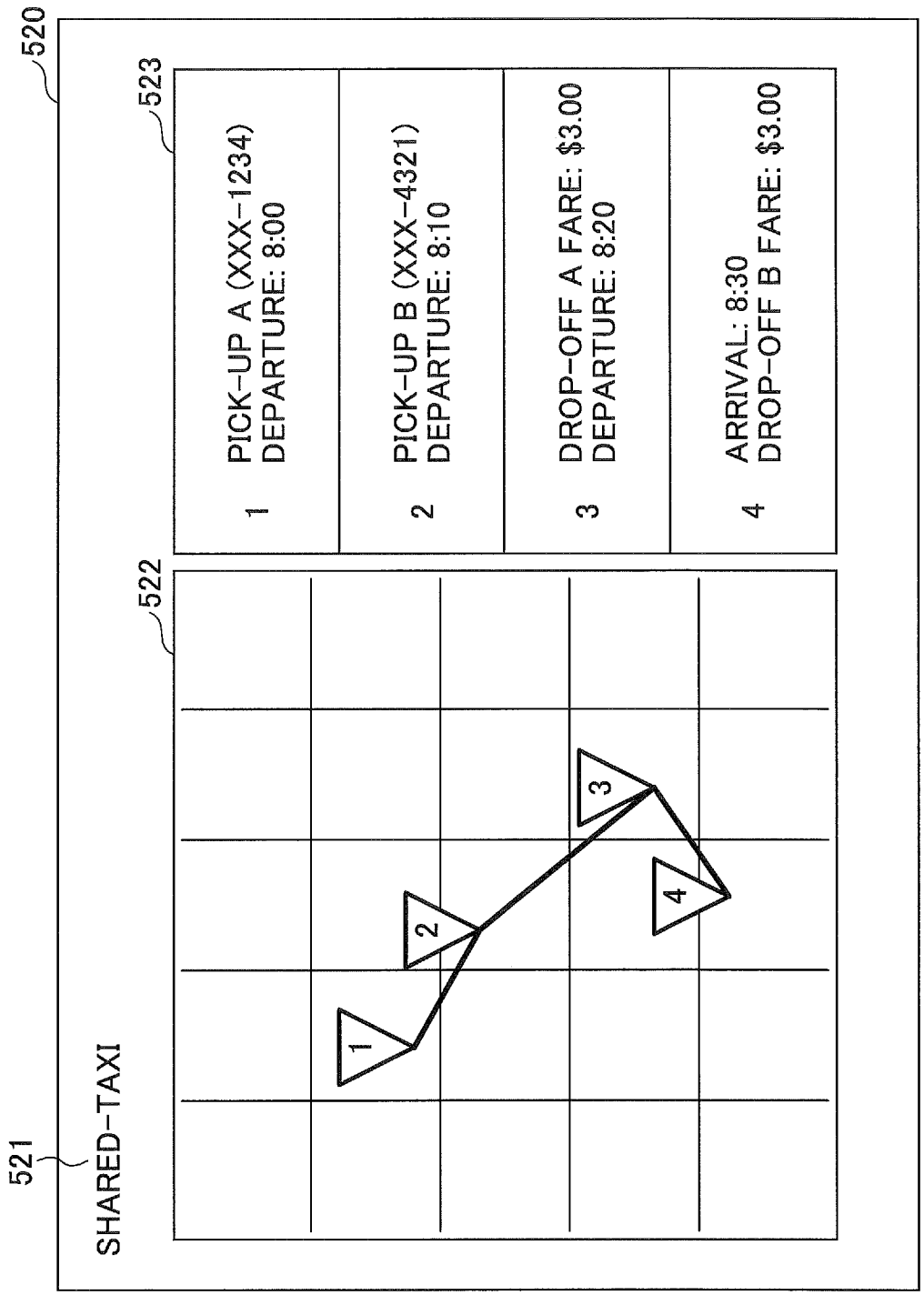
FIG. 16 is a diagram illustrating an example of the display of the schedule information on a vehicle terminal in the second embodiment.

FIG. 16 is a diagram illustrating an example of the display of the schedule information on the vehicle terminal in the second embodiment. A screen 520 illustrated in FIG. 16 includes a title region 521, a map region 522, a waypoint list region 523, or the like.

The title region 521 displays "shared taxi", which is the service type of the schedule block. The map region 522 displays the waypoints on the map based on the schedule information of the vehicle. Each waypoint is marked by a marker, and an order in which the waypoints are passed is identifiable by a number assigned to the marker. The map region 522 may also display positions of the users who are scheduled to board the vehicle. For this reason, the transportation service reservation apparatus 10 may collect current position information of each user obtained by the GPS unit 25 of the user terminal 20, and send the collected current position information to the vehicle terminal 30. In this case, the driver can easily find the users who are scheduled to board the vehicle.

The waypoint list region 523 displays the departure time or the arrival time at each waypoint, information of the user boarding the vehicle at each waypoint, or the like. The information of the user that is displayed may include a name of the user, a telephone number of the user, a fare to be charged to the user, or the like.

In addition, the navigation unit 36 of the vehicle terminal 30 may search a route connecting the waypoints included in the schedule information, and provide a guidance on the searched route. The navigation unit 36 may automatically guide the vehicle to travel along the searched route. In other words, the transportation service may employ a partially or fully self-driving vehicle.

The GPS unit 34 measures the current position of the vehicle every time the vehicle travels a predetermined distance, or every time the vehicle travels for a predetermined time, or every time a combination of the traveled distance and time is satisfied. The communication control unit 31 sends to the transportation service reservation apparatus 10 the position information of the vehicle obtained as a result of the measurement performed by the GPS unit 34. The vehicle control unit 128 of the transportation service reservation apparatus 10 stores the received position information in the vehicle information storage unit 132 in correspondence with identification information of the vehicle at the sending source of the position information. As a result, the transportation service reservation apparatus 10 can recognize the approximate current position of each vehicle. The product generating unit 123 may generate the product by taking into consideration the position information of each vehicle. In addition, the position information of the vehicle may be sent to the user terminal 20, and the position of the vehicle where the user is scheduled to board may be displayed on the user terminal 20. In this case, the user may easily find the vehicle the user is scheduled to board.

The passenger information reading unit 35 of the vehicle terminal 30 reads the user ID, for example, from the IC card or the like owned by the user and set on a card reader that is provided in the vehicle terminal 30 or is connected to the vehicle terminal 30, when the user boards the vehicle. The communication control unit 31 sends the user ID that is read from IC card or the like to the transportation service reservation apparatus 10.

The accounting unit 129 of the transportation service reservation apparatus 10 retrieves a record including the received user ID from the reservation information storage unit 135, and performs a process to collect a billing amount stored under an item "fare" in the retrieved record. For example, the billing amount may be directly withdrawn from an account identified by account information that is stored in the user information storage unit 131 in correspondence with the user ID. Alternatively, the billing amount may be charged to the user by other means, such as by e-mail (electronic mail), mail, or the like.

As described above, according to this second embodiment, it is possible to promote automation of the reservation of the transportation service, the control of the vehicle according to the reservation, the accounting, or the like.

Next, a description will be given of a third embodiment. Only parts of the third embodiment that differ from the first embodiment will be described in the following. Accordingly, unless otherwise indicated, parts of the third embodiment that are not described may be the same as those corresponding parts of the first embodiment.

Figure 17:
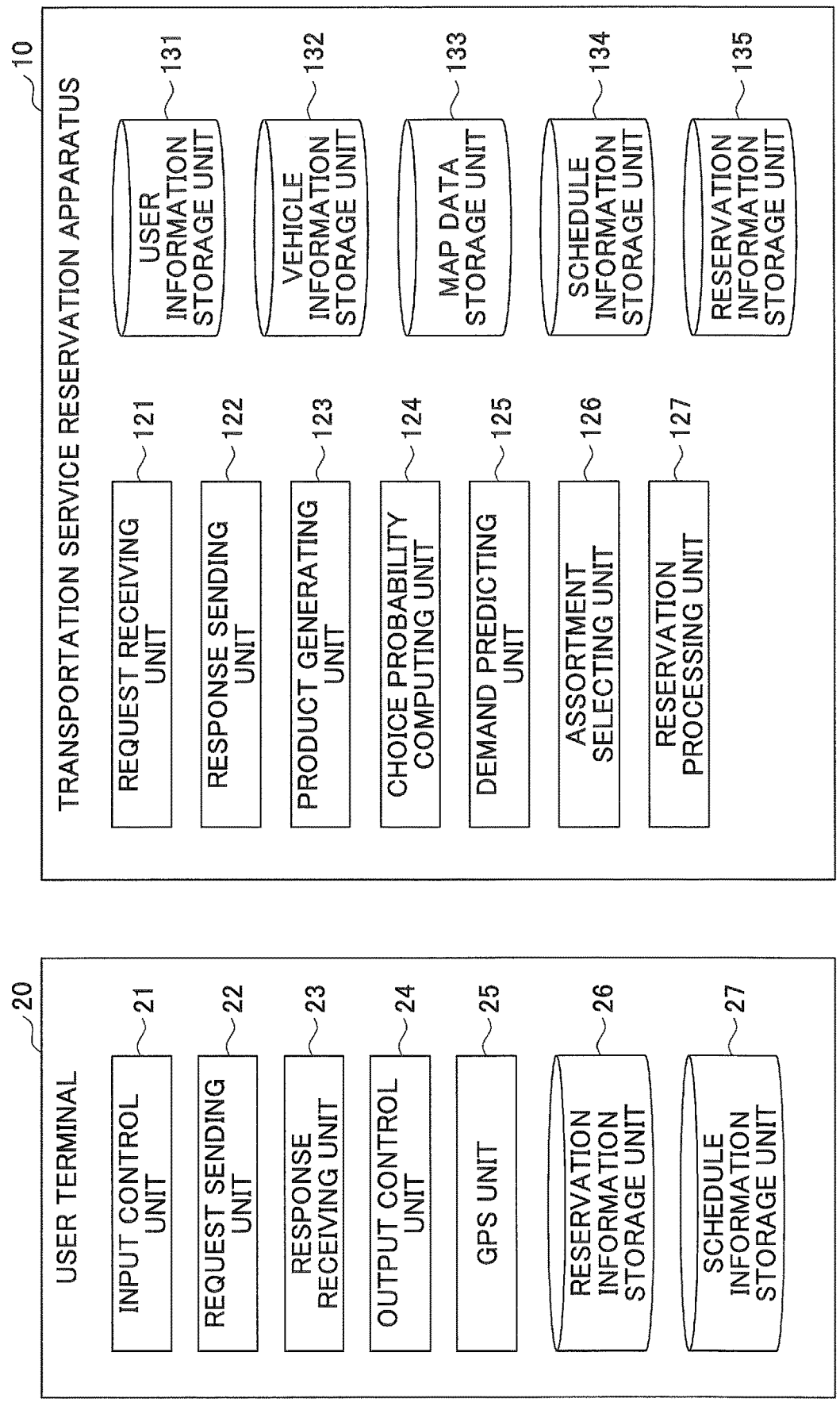
FIG. 17 is a diagram illustrating an example of the functional configuration of the transportation service reservation system in a third embodiment.

FIG. 17 is a diagram illustrating an example of the functional configuration of the transportation service reservation system in the third embodiment. In FIG. 17, those parts that are the same as those corresponding parts in FIG. 3 are designated by the same reference numerals, and a description thereof will be omitted.

In this third embodiment, the user terminal 20 further includes a reservation information storage unit 26, and a schedule information storage unit 27. The reservation information storage unit 26 stores reservation information of the user of the user terminal 20. The schedule information storage unit 27 stores the schedule information of the user. For example, the reservation information storage unit 26 and the schedule information storage unit 27 may be formed by an auxiliary storage unit of the user terminal 20.

In this third embodiment, when the input control unit 21 of the user terminal 20 receives from the user an instruction to refer to the products reserved by the user, the request sending unit 22 sends a send request that requests sending of the reservation information related to the user, with respect to the transportation service reservation apparatus 10. The send request may include the user ID of the user.

When the request receiving unit 121 of the transportation service reservation apparatus 10 receives the send request, the response sending unit 122 acquires from the reservation information storage unit 135 the reservation information related to the user ID included in the send request. The response sending unit 122 may send a list of the acquired reservation information to the user terminal 20.

When the response receiving unit 23 of the user terminal 20 receives the reservation information list, the response receiving unit 23 stores the reservation information list in the reservation information storage unit 26. In addition, the output control unit 24 displays the reservation information list received by the response receiving unit 23.

Figure 18:
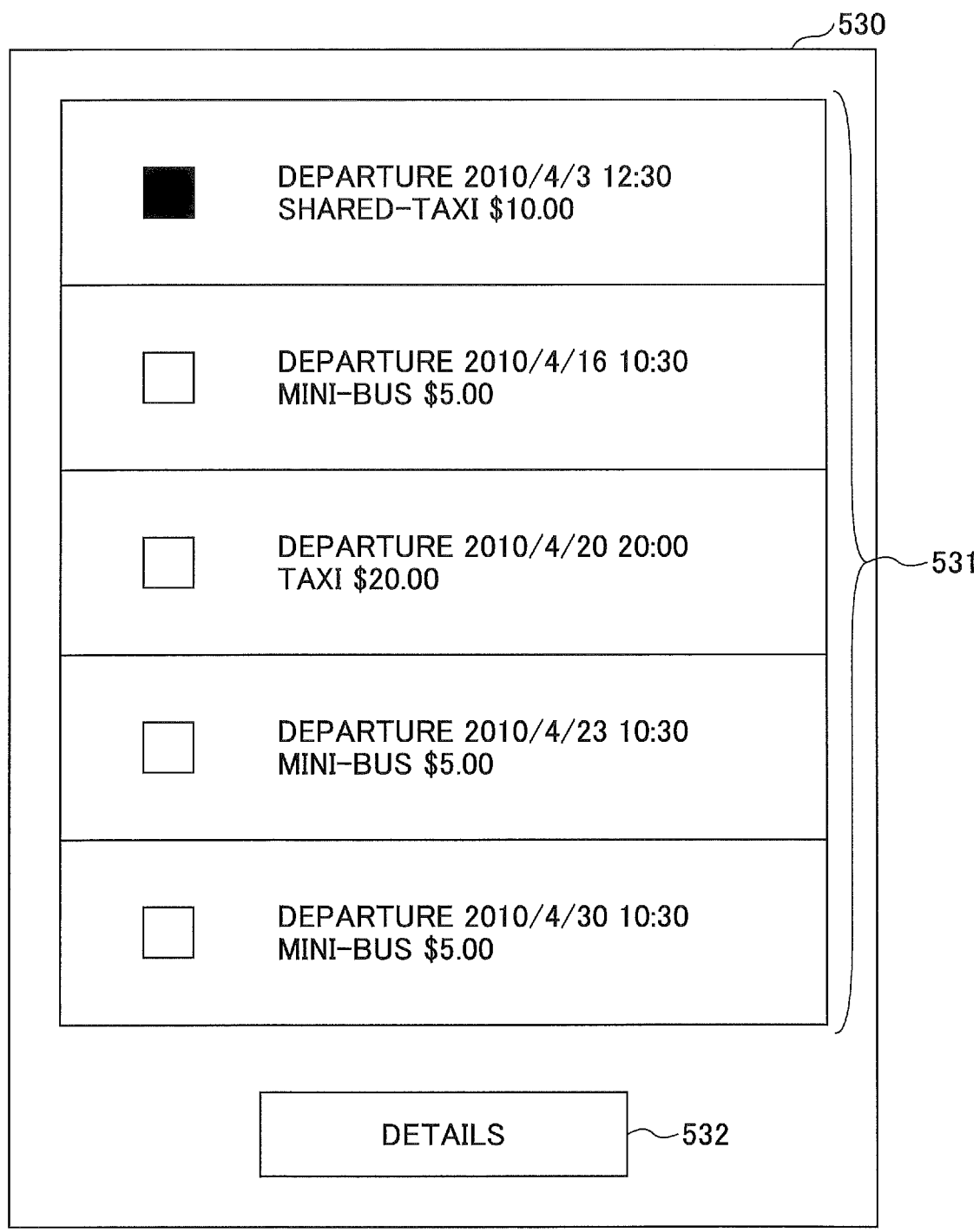
FIG. 18 is a diagram illustrating an example of the display of a reservation information list on a user terminal in the third embodiment.

FIG. 18 is a diagram illustrating an example of the display of the reservation information list on the user terminal in the third embodiment. As illustrated in FIG. 18, a screen 530 includes a list 531 of the products reserved by the user. The list 531 includes a check button that is arranged for each selectable product, so that each product can be selected by checking the corresponding check button as indicated by a black rectangular check button in FIG. 18.

When one of the products is elected from the list 531 and a details button 532 is pushed, the request sending unit 22 sends to the transportation service reservation apparatus 10 a send request that requests sending of the reservation information and includes the schedule ID related to the selected product.

When the request receiving unit 121 of the transportation service reservation apparatus 10 receives the send request, the response sending unit 122 acquires from the schedule information storage unit 135 the schedule information (or schedule block) related to the schedule ID included in the sending request. The response sending unit 122 sends the acquired schedule information to the user terminal 20.

When the response receiving unit 23 of the user terminal 20 receives the schedule information, the response receiving unit 23 stores the received schedule information in the schedule information storage unit 27. In addition, the output control unit 24 displays the received schedule information as illustrated in FIG. 16, for example. In the screen 520 illustrated in FIG. 16, the marker indicating the boarding and alighting locations of the user may be made different from those of other passengers, so as to facilitate the user recognize the boarding and alighting locations of the user. The map region 522 illustrated in FIG. 16 may display the position of the vehicle to which the user is scheduled to board. In this case, the user can easily find the vehicle to which the user is scheduled to board.

In this third embodiment, the transportation means does not necessarily have to be the vehicles dedicated to the transportation services. For example, a regular taxi may be used for the transportation means. The transportation service reservation apparatus 10 may reserve the regular taxi on-line through reservation means of the regular taxi, such as an API (Application Program Interface) of a reservation system, for example. The passenger may refer to the screen 520 illustrated in FIG. 16 and instruct the route to the driver, such as a driving directions, stops to be made on the way to the destination, or the like. The fare for the regular taxi needs to be paid according to the amount indicated on the fare meter of the regular taxi. Accordingly, in the case in which the service type is the shared-taxi or the mini-bus and a plurality of users share the vehicle, a sum total of the fares of each of the users becomes the amount indicated on the fare meter of the regular taxi. Of the amount indicated on the fare meter of the regular taxi, the transportation service reservation apparatus 10 may compute an amount to be paid by each of the users, based on the routes of each of the users. Each of the users, except a last-alighting user who will alight last from the vehicle, may hand over the amount to be paid by each to the last-alighting user, so that the last-alighting user may pay the sum total of the fares of each of the users including the last-alighting user indicated on the fare meter of the regular taxi. Alternatively, in a case in which the transportation service reservation apparatus 10 includes the accounting unit 129, the accounting unit 129 may directly withdraw the amount to be paid by each of the users, except the last-alighting user, from the account of each, and remit to an account of the last-alighting user a sum of the amounts withdrawn from the account of each of the users except the last-alighting user, so that the last-alighting user may pay the sum total of the fares of each of the users including the last-alighting user indicated on the fare meter of the regular taxi when alighting from the regular taxi.

As described above, according to this third embodiment, the transportation means does not necessarily have to be the vehicles dedicated to the transportation services. For this reason, the transportation services can be provided under reduced constraints related to the transportation means.

In each of the embodiments described above, the schedule information storage unit 134 is an example of a storage unit. The request receiving unit 121 is an example of a receiving unit. The product generating unit 123 is an example of a generating unit. The choice probability computing unit 124 is an example of a first computing unit. The demand predicting unit 125 is an example of a second computing unit. The assortment selection unit 126 is an example of a selection unit.

According to the embodiments described above, it is possible to provide options to improve the sum total of the profit of the service provider or the user satisfaction of the service, by taking future demands into consideration.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transportation service reservation method comprising:

receiving, by a computer of a transportation service reservation apparatus, a ride request specifying an origin and a destination, received from a user terminal that is communicable with the transportation service reservation apparatus;

generating, by the computer, feasible products having a plurality of service types, by referring to a memory that stores information indicating a schedule allocated to each vehicle and the service types of the schedule, for each vehicle capable of providing products having the plurality of service types, wherein the products are defined as information indicating service contents of various transportation services that are provided;

computing, by the computer, a probability of each product of the products forming an assortment of the feasible products to be presented to a user being chosen, for each of assortments of feasible products satisfying a predetermined condition amongst subsets of a feasible product set that are generated, wherein the predetermined condition is a constraint about a number of the feasible products from each of the service types forming the assortment;

computing, by the computer, an expected value of a number of ride requests which will be received in future;

selecting, by the computer, an assortment to be presented with respect to the ride request, from the assortments satisfying the predetermined condition, based on the probability of being chosen and the expected value of the number of ride requests;

transmitting, by the computer, the assortment to be presented with respect to the ride request selected by the selecting, to the user terminal; and displaying, by a display of the user terminal, the assortment received from the transportation service reservation apparatus on a screen of the display including an option list region and a map region, wherein the option list region of the screen displays the products including a scheduled pick-up time, a scheduled drop-off time, and a fare, wherein the map region of the screen displays a pickup location of the origin and a drop-off location of the destination of one of the products selected by the user from the option list region, wherein the screen of the display of the user terminal includes a title region, the map region, and a waypoint list region, wherein the title region displays a service type of a schedule block including a shared vehicle, wherein the map region displays waypoints on the map based on the schedule of the vehicle, wherein the waypoint list region displays a departure time at each waypoint, an arrival time at each waypoint, or information of a user boarding the vehicle at each waypoint, wherein the user terminal further comprises a navigation unit and a GPS unit, wherein the navigation unit searches a route connecting the waypoints based on the schedule of the vehicle and guides the vehicle automatically along the searched route, wherein the GPS unit measures a current position of the vehicle every time the vehicle travels a predetermined distance, or every time the vehicle travels for a predetermined time, or every time a combination of the traveled distance and time is satisfied, wherein the products are generated based on the current position of the vehicle, and wherein the current position of the vehicle and a position of the vehicle where the user is scheduled to board are displayed on the user terminal.

2. The transportation service reservation method as claimed in claim 1, wherein a number of ride requests with which each service type of the plurality of service types can simultaneously cope differs mutually amongst the plurality of service types.

3. The transportation service reservation method as claimed in claim 1, wherein a route modifying capability differs mutually amongst the plurality of service types.

4. The transportation service reservation method as claimed in claim 1, wherein the selecting includes computing an expected value of a sum total of profit of a service provider, for each of the assortments satisfying the predetermined condition, based on the probability of being chosen and the expected value of the number of ride requests, and selecting the assortment to be presented with respect to the ride request, based on the expected value of the sum total of the profit.

5. The transportation service reservation method as claimed in claim 1, wherein the selecting includes computing an expected value of a sum total of utility of users, for each of the assortments satisfying the predetermined condition, based on the probability of being chosen and the expected value of the number of ride requests, and selecting the assortment to be presented with respect to the ride request, based on the expected value of the sum total of the utility.

6. The transportation service reservation method as claimed in claim 1, further comprising:

returning the assortment selected by the selecting to a sending source of the ride request, receiving the product selected by a user from the assortment that is returned, and sending information related to the schedule to provide the product, with respect to the vehicle providing the product.

7. The transportation service reservation method as claimed in claim 1, wherein the expected value of the number of ride requests which will be received in the future is computed based on a log of the ride request received by the receiving.

8. A transportation service reservation system comprising:
a user terminal having a first processor; and
a transportation service reservation apparatus, the transportation service reservation apparatus including:
a second processor configured to perform a process including:
storing information indicating a schedule allocated to each vehicle and service types of the schedule for each vehicle capable of providing products having a plurality of service types;
receiving a ride request specifying an origin and a destination from the user terminal that is communicable with the transportation service reservation apparatus;
generating feasible products having a plurality of service types, by referring to the information indicating the schedule allocated to each vehicle and the service types of the schedule, for each vehicle capable of providing products having the plurality of service types, wherein the products are defined as information indicating service contents of various transportation services that are provided;
computing a probability of each product of the products forming a assortment of the feasible products to be presented to a user being chosen, for each of assortments of feasible products satisfying a predetermined condition amongst subsets of a feasible product set that are generated, wherein the predetermined condition is a constraint about a number of the feasible products from each of the service types forming the assortment;
computing an expected value of a number of ride requests which will be received in future;
selecting an assortment to be presented with respect to the ride request, from the assortments satisfying the predetermined condition, based on the probability of being chosen and the expected value of the number of ride requests;
transmitting the assortment to be presented with respect to the ride request selected by the selecting, to the user terminal; and
the first processor of the user terminal configured to perform a process including:
displaying, by a display of the user terminal, the assortment received from the transportation service reservation apparatus on a screen of the display including an option list region and a map region, wherein the option list region of the screen displays the products including a scheduled pick-up time, a scheduled drop-off time, and a fare, wherein the map region of the screen displays a pickup location of the origin and a drop-off location of the destination of one of the products selected by the user from the option list region, wherein the screen of the display of the user terminal includes a title region, the map region, and a waypoint list region, wherein the title region displays a service type of a schedule block including a shared vehicle, wherein the map region displays waypoints on the map based on the schedule of the vehicle, wherein the waypoint list region displays a departure time at each waypoint, an arrival time at each waypoint, or information of a user boarding the vehicle at each waypoint, wherein the user terminal further comprises a navigation unit and a GPS unit, wherein the navigation unit searches a route connecting the waypoints based on the schedule of the vehicle and guides the vehicle automatically along the searched route, wherein the GPS unit measures a current position of the vehicle every time the vehicle travels a predetermined distance, or every time the vehicle travels for a predetermined time, or every time a combination of the traveled distance and time is satisfied, wherein the products are generated based on the current position of the vehicle, and wherein the current position of the vehicle and a position of the vehicle where the user is scheduled to board are displayed on the user terminal.

9. The transportation service reservation apparatus as claimed in claim 8, wherein a number of ride requests with which each service type of the plurality of service types can simultaneously cope differs mutually amongst the plurality of service types.

10. The transportation service reservation apparatus as claimed in claim 8, wherein a route modifying capability differs mutually amongst the plurality of service types.

11. The transportation service reservation apparatus as claimed in claim 8, wherein the selecting includes
computing an expected value of a sum total of profit of a service provider, for each of the assortments satisfying the predetermined condition, based on the probability of being chosen and the expected value of the number of ride requests, and
selecting the assortment to be presented with respect to the ride request, based on the expected value of the sum total of the profit.

12. The transportation service reservation apparatus as claimed in claim 8, wherein the selecting includes
computing an expected value of a sum total of a utility of a user, for each of the assortments satisfying the predetermined condition, based on the probability of being chosen and the expected value of the number of ride requests, and
selecting the assortment to be presented with respect to the ride request, based on the expected value of the sum total of the utility.

13. The transportation service reservation apparatus as claimed in claim 8, wherein the process further includes
returning the assortment selected by the selecting to a sending source of the ride request, receiving the product selected by a user from the assortment that is returned, and sending information related to the schedule to provide the product, with respect to the vehicle providing the product.

14. The transportation service reservation apparatus as claimed in claim 8, wherein the expected value of the number of ride requests which will be received in the future is computed based on a log of the ride request received by the receiving.

15. A non-transitory computer-readable storage medium having stored therein a program which, when executed by a computer of a transportation service reservation apparatus, causes the computer to perform a process comprising:

receiving, by the computer of the transportation service reservation apparatus, a ride request specifying an origin and a destination, received from a user terminal that is communicable with the transportation service reservation apparatus;

generating, by the computer, feasible products having a plurality of service types, by referring to a memory that stores information indicating a schedule allocated to each vehicle and the service types of the schedule, for each vehicle capable of providing products having the plurality of service types, wherein the products are defined as information indicating service contents of various transportation services that are provided;

computing, by the computer, a probability of each product of the products forming an assortment of feasible products to be presented to a user being chosen, for each of assortments of feasible products satisfying a predetermined condition amongst subsets of a feasible product set that are generated, wherein the predetermined condition is a constraint about a number of the feasible products from each of the service types forming the assortment;

computing, by the computer, an expected value of a number of ride requests which will be received in future;

selecting, by the computer, an assortment to be presented with respect to the ride request, from the assortments satisfying the predetermined condition, based on the probability of being chosen and the expected value of the number of ride requests;

transmitting, by the computer, the assortment to be presented with respect to the ride request selected by the selecting, to the user terminal; and displaying, by a display of the user terminal, the assortment received from the transportation service reservation apparatus on a screen of the display including an option list region and a map region, wherein the option list region of the screen displays the products including a scheduled pick-up time, a scheduled drop-off time, and a fare, wherein the map region of the screen displays a pickup location of the origin and a drop-off location of the destination of one of the products selected by the user from the option list region, wherein the screen of the display of the user terminal includes a title region, the map region, and a waypoint list region, wherein the title region displays a service type of a schedule block including a shared vehicle, wherein the map region displays waypoints on the map based on the schedule of the vehicle, wherein the waypoint list region displays a departure time at each waypoint, an arrival time at each waypoint, or information of a user boarding the vehicle at each waypoint, wherein the user terminal further comprises a navigation unit and a GPS unit, wherein the navigation unit searches a route connecting the waypoints based on the schedule of the vehicle and guides the vehicle automatically along the searched route, wherein the GPS unit measures a current position of the vehicle every time the vehicle travels a predetermined distance, or every time the vehicle travels for a predetermined time, or every time a combination of the traveled distance and time is satisfied, wherein the products are generated based on the current position of the vehicle, and wherein the current position of the vehicle and a position of the vehicle where the user is scheduled to board are displayed on the user terminal.

16. The non-transitory computer-readable storage medium as claimed in claim 15, wherein a number of ride requests with which each service type of the plurality of service types can simultaneously cope differs mutually amongst the plurality of service types.

17. The non-transitory computer-readable storage medium as claimed in claim 15, wherein a route modifying capability differs mutually amongst the plurality of service types.

18. The non-transitory computer-readable storage medium as claimed in claim 15, wherein the selecting includes computing an expected value of a sum total of profit of a service provider, for each of the assortment satisfying the predetermined condition, based on the probability of being chosen and the expected value of the number of ride requests, and selecting the assortment to be presented with respect to the ride request, based on the expected value of the sum total of profit.

19. The non-transitory computer-readable storage medium as claimed in claim 15, wherein the selecting includes computing an expected value of a sum total of a utility of users, for each of the assortments satisfying the predetermined condition, based on the probability of being chosen and the expected value of the number of ride requests, and selecting the assortment to be presented with respect to the ride request, based on the expected value of the sum total of the utility.

20. The non-transitory computer-readable storage medium as claimed in claim 15, wherein the process further comprises:

returning the assortment selected by the selecting to a sending source of the ride request, receiving the product selected by a user from the assortment that is returned, and sending information related to the schedule to provide the product, with respect to the vehicle providing the product.

21. The non-transitory computer-readable storage medium as claimed in claim 15, wherein the expected value of the number of ride requests which will be received in the future is computed based on a log of the ride request received by the receiving.

* * * * *